United States Patent
Unagami et al.

(10) Patent No.: US 10,951,400 B2
(45) Date of Patent: *Mar. 16, 2021

(54) AUTHENTICATION METHOD, AUTHENTICATION SYSTEM, AND CONTROLLER

(71) Applicant: PANASONIC INTELLECTUAL PROPERTY MANAGEMENT CO., LTD., Osaka (JP)

(72) Inventors: Yuji Unagami, Osaka (JP); Manabu Maeda, Osaka (JP); Hideki Matsushima, Osaka (JP); Tomoki Takazoe, Kanagawa (JP); Yoichi Masuda, Tokyo (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/511,293

(22) Filed: Jul. 15, 2019

(65) Prior Publication Data
US 2019/0342086 A1 Nov. 7, 2019

Related U.S. Application Data

(63) Continuation of application No. 15/400,031, filed on Jan. 6, 2017, now Pat. No. 10,404,453, which is a
(Continued)

(30) Foreign Application Priority Data

Jan. 19, 2016 (JP) .............................. JP2016-007555

(51) Int. Cl.
*H04L 9/00* (2006.01)
*H04L 9/08* (2006.01)
(Continued)

(52) U.S. Cl.
CPC ............ *H04L 9/0833* (2013.01); *G06F 21/44* (2013.01); *H04L 9/0631* (2013.01);
(Continued)

(58) Field of Classification Search
CPC ..................................................... H04L 63/061
See application file for complete search history.

(56) References Cited

U.S. PATENT DOCUMENTS 8,195,940 B2 * 6/2012 Lioy .................... H04L 63/0892
713/169
2005/0050004 A1 * 3/2005 Sheu ...................... H04L 63/065
(Continued)

FOREIGN PATENT DOCUMENTS

| JP | 2005-341528 | 12/2005 |
| JP | 2010-074225 A | 4/2010 |

(Continued)

OTHER PUBLICATIONS

Chinese Search Report (English Language Translation), dated Aug. 28, 2020, for the related Chinese Patent Application No. 201680001259.5.
(Continued)

*Primary Examiner* — Josnel Jeudy
(74) *Attorney, Agent, or Firm* — Greenblum & Bernstein, P.L.C.

(57) ABSTRACT

An authentication method for a group of devices connected to a network includes selecting the first controller as a coordinator, the coordinator being configured to manage a group key to be used in common in the group. The method includes generating the group key, and performing first mutual authentication and second mutual authentication. The method also includes sharing the group key with each device for which the first mutual authentication has been successful, and sharing the group key with each second
(Continued)

controller for which the second mutual authentication has been successful. The method further includes encrypting transmission data by using the group key to generate encrypted data, generating, authentication data by using the group key, and simultaneously broadcasting a message to each device for which the first mutual authentication has been successful and each second controller for which the second mutual authentication has been successful.

15 Claims, 27 Drawing Sheets

Related U.S. Application Data continuation of application No. PCT/JP2016/000888, filed on Feb. 19, 2016.

(60) Provisional application No. 62/158,585, filed on May 8, 2015.

(51) Int. Cl.
  *G06F 21/44* (2013.01)
  *H04L 29/06* (2006.01)
  *H04Q 9/00* (2006.01)
  *H04L 9/06* (2006.01)
  *H04L 9/32* (2006.01)

(52) U.S. Cl.
  CPC .......... *H04L 9/0637* (2013.01); *H04L 9/0891* (2013.01); *H04L 9/3242* (2013.01); *H04L 63/0428* (2013.01); *H04L 63/062* (2013.01); *H04L 63/065* (2013.01); *H04L 63/0869* (2013.01); *H04Q 9/00* (2013.01); *H04L 63/104* (2013.01); *H04L 2209/601* (2013.01)

(56) References Cited

U.S. PATENT DOCUMENTS

| | | |
|---|---|---|
| 2006/0115085 A1 | 6/2006 | Iwamura |
| 2007/0116292 A1 | 5/2007 | Kurita et al. |
| 2012/0243683 A1 | 9/2012 | Oba et al. |
| 2013/0142336 A1* | 6/2013 | Fries .................... H04L 9/0833 380/278 |
| 2017/0126404 A1 | 5/2017 | Unagami et al. |

FOREIGN PATENT DOCUMENTS

| | | |
|---|---|---|
| JP | 2012-205088 A | 10/2012 |
| JP | 2013-192169 A | 9/2013 |
| WO | 2011/163073 A1 | 12/2011 |
| WO | 2016/181585 A1 | 11/2016 |

OTHER PUBLICATIONS

International Search Report of PCT Application No. PCT/JP2016/000888, dated May 10, 2016.
Federal Information Processing Standards Publication 186-4, "Digital Signature Standard", National Institute of Standards and Technology, Jul. 2013.
Elaine Barker et al., "Recommendation for Pair-Wise Key Establishment Schemes Using Discrete Logarithm Cryptography", NIST Special Publication 800-56A, Revision 2, May 2013.
D. Forsberg et al., "Protocol for Carrying Authentication for Network Access", RFC5191, May 2008.
E. Rescoria et al., "Datagram Transport Layer Security Version 1.2", Internet Engineering Task Force, RFC6347, Jan. 2012.
Extended European Search Report, dated Feb. 16, 2018, from the European Patent Office (EPO) for the related European Patent Application 16792320.0.
A. Menezes et al., "Handbook of Applied Cryptography"—Mix-Chapters 12, 13, In: USA, 1996, CRC Press, Inc., XP055449553, pp. 526-681.
Charlie Kaufman et al., "Network Security: Private Communication in a Public World", 2$^{nd}$ Edition—Chapter 17, in: USA, 2002, Pearson Education Inc., USA, XP055444596, pp. 423-439.

* cited by examiner

FIG. 5A

| DEVICE ID 501 | CERTIFICATE ID 502 | SHARED KEY 503 | GROUP KEY 504 | GROUP KEY VALIDITY PERIOD (SECONDS) 505 | GROUP KEY UPDATE FLAG 506 |
|---|---|---|---|---|---|
| 001 | 00a | 1010...1 | 01101...1 | 86400 | 1 |
| 002 | 00b | 1011...0 | 01101...1 | 86400 | 1 |
| ... | ... | ... | ... | ... | ... |

| CONTROL-TARGET DEVICE 511 | 001,... |
| SECURITY COORDINATOR (SC) 512 | 003 |
| DEVICE UNDER CONTROL 513 | 001, 002,... |

| 500 | 501 | 502 | 503 | 504 | 505 | 506 |
|---|---|---|---|---|---|---|
| | CONTROLLER ID | CERTIFICATE ID | SHARED KEY | GROUP KEY | GROUP KEY VALIDITY PERIOD (SECONDS) | GROUP KEY UPDATE FLAG |
| | 001 | 00a | 1010...1 | 01101...1 | 86400 | 1 |

FIG. 19B

| 510 | |
|---|---|
| 511 | CONTROL-TARGET DEVICE | 001 |
| 512 | SECURITY COORDINATOR | 003 |
| 513 | DEVICE UNDER CONTROL | 001 |

FIG. 19C

| 500 | 501 | 502 | 503 | 504 | 505 | 506 |
|---|---|---|---|---|---|---|
| | CONTROLLER ID | CERTIFICATE ID | SHARED KEY | GROUP KEY | GROUP KEY VALIDITY PERIOD (SECONDS) | GROUP KEY UPDATE FLAG |
| | 002 | 00b | 1011...0 | 01110...0 | 2280 | 1 |

FIG. 19D

| 510 | |
|---|---|
| 511 | CONTROL-TARGET DEVICE | 002 |
| 512 | SECURITY COORDINATOR | 004 |
| 513 | DEVICE UNDER CONTROL | 002 |

FIG. 20A

| CONTROLLER ID | CERTIFICATE ID | SHARED KEY | GROUP KEY |
|---|---|---|---|
| 003 | 00c | 1010...1 | 01101...1 |

| CONTROLLING CONTROLLER | 003 |
|---|---|
| SECURITY COORDINATOR | 003 |

| CONTROLLER ID | CERTIFICATE ID | SHARED KEY | GROUP KEY |
|---|---|---|---|
| 004 | 00d | 1011...0 | 01110...0 |

| CONTROLLING CONTROLLER | 004 |
|---|---|
| SECURITY COORDINATOR | 004 |

| 500 | 501 | 502 | 503 | 504 | 505 | 506 |
|---|---|---|---|---|---|---|
| | CONTROLLER ID | CERTIFICATE ID | SHARED KEY | GROUP KEY | GROUP KEY VALIDITY PERIOD (SECONDS) | GROUP KEY UPDATE FLAG |
| | 001 | 00a | 1010...1 | 01101...1 | 86400 | 1 |
| | 002 | 00b | 1100...1 | 01110...0 | 2280 | 0 |
| | 004 | 00d | 1101...0 | 01110...0 | 2280 | 0 |

FIG. 21B

| 510 | |
|---|---|
| 511 CONTROL-TARGET DEVICE | 001 |
| 512 SECURITY COORDINATOR | 003 |
| 513 DEVICE UNDER CONTROL | 001, 002, 004 |

FIG. 21C

| 500 | 501 | 502 | 503 | 504 | 505 | 506 |
|---|---|---|---|---|---|---|
| | CONTROLLER ID | CERTIFICATE ID | SHARED KEY | GROUP KEY | GROUP KEY VALIDITY PERIOD (SECONDS) | GROUP KEY UPDATE FLAG |
| | 002 | 00b | 1011...0 | 01110...0 | – | – |
| | 003 | 00c | 1101...0 | 01110...0 | – | – |

FIG. 21D

| 510 | |
|---|---|
| 511 CONTROL-TARGET DEVICE | 002 |
| 512 SECURITY COORDINATOR | 003 |
| 513 DEVICE UNDER CONTROL | – |

| | 900 | | |
|---|---|---|---|
| 901 | 902 | 903 | 904 |
| CONTROLLER ID | CERTIFICATE ID | SHARED KEY | GROUP KEY |
| 003 | 00c | 1010...1 | 01101...1 |

910

| | | |
|---|---|---|
| 911 | CONTROLLING CONTROLLER | 003 |
| 912 | SECURITY COORDINATOR | 003 |

| | 900 | | |
|---|---|---|---|
| 901 | 902 | 903 | 904 |
| CONTROLLER ID | CERTIFICATE ID | SHARED KEY | GROUP KEY |
| 004 | 00d | 1011...0 | 01110...0 |
| 003 | 00c | 1100...1 | 01110...0 |

910

| | | |
|---|---|---|
| 911 | CONTROLLING CONTROLLER | 004 |
| 912 | SECURITY COORDINATOR | 003 |

AUTHENTICATION METHOD, AUTHENTICATION SYSTEM, AND CONTROLLER

CROSS REFERENCE TO RELATED APPLICATION

This is a continuation application of U.S. patent application Ser. No. 15/400,031, filed Jan. 6, 2017, which is a Continuation of International Patent Application No. PCT/JP2016/000888, filed Feb. 19, 2016, which claims the benefit of U.S. Provisional Patent Application No. 62/158,585, filed May 8, 2015, and which claims the benefit of Japanese Patent Application No. 2016-007555, filed Jan. 19, 2016. The disclosure of each of the above-identified applications, including the specification, drawings, and claims, is incorporated herein by reference in its entirety.

BACKGROUND

1. Technical Field

The present disclosure relates to a technique for performing mutual authentication between controllers and devices connected to a network and sharing a group key among the controllers and the devices.

2. Description of the Related Art

Recently, services that utilize various kinds of history information collected to a cloud server from devices, such as home appliances, AV (Audio/Visual) devices, and residential facility devices having a network connection function (hereinafter, simply referred to as "devices".), have been expected.

Such services are conceivably implemented such that a device (hereinafter, referred to as a "controller".) for controlling devices is installed in a home and the controller relays communications between the devices and the cloud server. In such a case, it is required to prevent spoofing by an unauthorized device and information leakage due to eavesdropping of communication content for connections between the controller and the devices.

As a countermeasure against spoofing by an unauthorized device, authentication is performed between a controller and a device by using PKI (Public Key Infrastructure), for example. In addition, as a countermeasure against information leakage, an authenticated controller and an authenticated device share a key for use in encrypted communication and perform encrypted communication, for example (see, for example, Federal Information Processing Standards Publication (FIPS PUB) 186-4: Digital Signature Standard (DSS), National Institute of Standards and Technology (NIST), July 2013 and NIST Special Publication 800-56A Revision 2: Recommendation for Pair-Wise Key Establishment Schemes Using Discrete Logarithm Cryptography, National Institute of Standards and Technology (NIST), May 2013).

In the case where there are a plurality of devices connected to a controller, if the controller and the plurality of devices share a single key (hereinafter, referred to as a "group key".) for encrypted communication (see, for example, Japanese Patent No. 4576997), encryption can be applied to simultaneous broadcast transmission (multicast communication) in which the controller simultaneously transmits the same information to the devices.

SUMMARY

One non-limiting and exemplary embodiment provides a further improvement relating to a group key in an authentication system.

In one general aspect, the techniques disclosed here feature an authentication method for a group to which one or more devices, a first controller, and one or more second controllers belong, the one or more devices, the first controller, and the one or more second controllers being connected to a network. The authentication method includes selecting, using one of the first controller and the one or more second controllers, the first controller as a coordinator in accordance with an attribute of the first controller and the one or more second controllers, the coordinator being configured to manage a group key to be used in common in the group; generating, using the first controller, the group key; performing, using the first controller and each of the one or more devices, first mutual authentication between the first controller and the device; performing, using the first controller and each of the one or more second controllers, second mutual authentication between the first controller and the second controller; sharing, using the first controller, the group key with each device for which the first mutual authentication has been successful among the one or more devices; sharing, using the first controller, the group key with each second controller for which the second mutual authentication has been successful among the one or more second controllers; encrypting, using the first controller, transmission data by using the group key to generate encrypted data; generating, using the first controller, authentication data by using the group key from (i) a header, (ii) a source address corresponding to the first controller, (iii) a destination address corresponding to each device and each second controller, and (iv) the transmission data; and simultaneously broadcasting, using the first controller, a message including (i) the header, (ii) the source address, (iii) the destination address, (iv) the encrypted data, and (v) the authentication data from the first controller to each device for which the first mutual authentication has been successful and each second controller for which the second mutual authentication has been successful.

According to the present disclosure, when a group on a network includes a plurality of controllers, a suitable controller is successfully selected as a coordinator that manages a group key to be used in common in the group. In addition, falsification of a header, a source address, or a destination address of a message is successfully prevented by including the header, the source address, and the destination address of the message when authentication data (MAC (Message Authentication Code)) is generated by using the group key.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 5A and 5B are diagrams illustrating examples of a connected device management table and group-relating information stored in the controller, respectively;

FIG. 11 is a sequence diagram illustrating an example of an operation performed by the authentication system when a controller participates in;

FIGS. 19A, 19B, 19C, and 19D are diagrams illustrating a connected device management table and group-relating information stored in a controller A before group merger and a connected device management table and group-relating information stored in a controller B before group merger, respectively;

FIGS. 20A, 20B, 20C, and 20D are diagrams illustrating a connected controller management table and group-relating information stored in a device A before group merger and a connected controller management table and group-relating information stored in a device B before group merger, respectively;

FIGS. 21A, 21B, 21C, and 21D are diagrams illustrating the connected device management table and the group-relating information stored in the controller A after group merger and the connected device management table and the group-relating information stored in the controller B after group merger, respectively;

DETAILED DESCRIPTION

How Present Disclosure have been Reached

A circumstance is assumed where a plurality of controllers control a single device in a network, such as a HAN (Home Area Network).

In such a circumstance, it is presumed that each of the controllers separately generates a group key and distributes the group key to the device and that the device performs encrypted communication by using different group keys for different controllers. However, some devices may be unable to allocate resources necessary for encrypted communication using a plurality of group keys. For example, some devices may be unable to perform encrypted communication using a plurality of group keys because of their low computation performance. In addition, when devices have a small storage capacity, they may be unable to store a necessary number of group keys to perform encrypted communication with all the controllers.

Accordingly, a configuration is conceivable in which some or all of devices and controllers on a network constitute a group, a controller that manages a group key is selected from among the controllers in the group, and the selected controller generates a group key and distributes the group key to the devices and the other controllers in the group. However, in this configuration, selecting the controller that manages the group key involves an issue. For example, some controllers are unable to maintain communication to the devices and the other controllers always active because a state of power-off or network disconnection frequently occurs. If the controller that manages the group key is selected at random, one of such controllers is possibly selected. If communication to the controller that manages the group key is not available, a new device or controller is not allowed to participate in the group and share the group key. In addition, the group key is desirably updated on a regular basis from the viewpoint of security. However, if communication to the controller that manages the group key is not available, updating of the group key fails.

The present disclosure has been made in view of such issues and provides an authentication method for selecting a suitable controller as a controller that manages a group key to be used in common in a group when the group on a network includes a plurality of controllers.

First Embodiment

An authentication system according to an embodiment of the present disclosure will be described below with reference to the drawings. Note that the values, shapes, materials, components, arrangements and connections of the components, steps, orders of the steps, etc. given in the embodiment are merely illustrative, and are not intended to limit the present disclosure.

Overview

Now, an overview of an authentication system 100 according to an embodiment of the present disclosure will be described.

Figure 1:
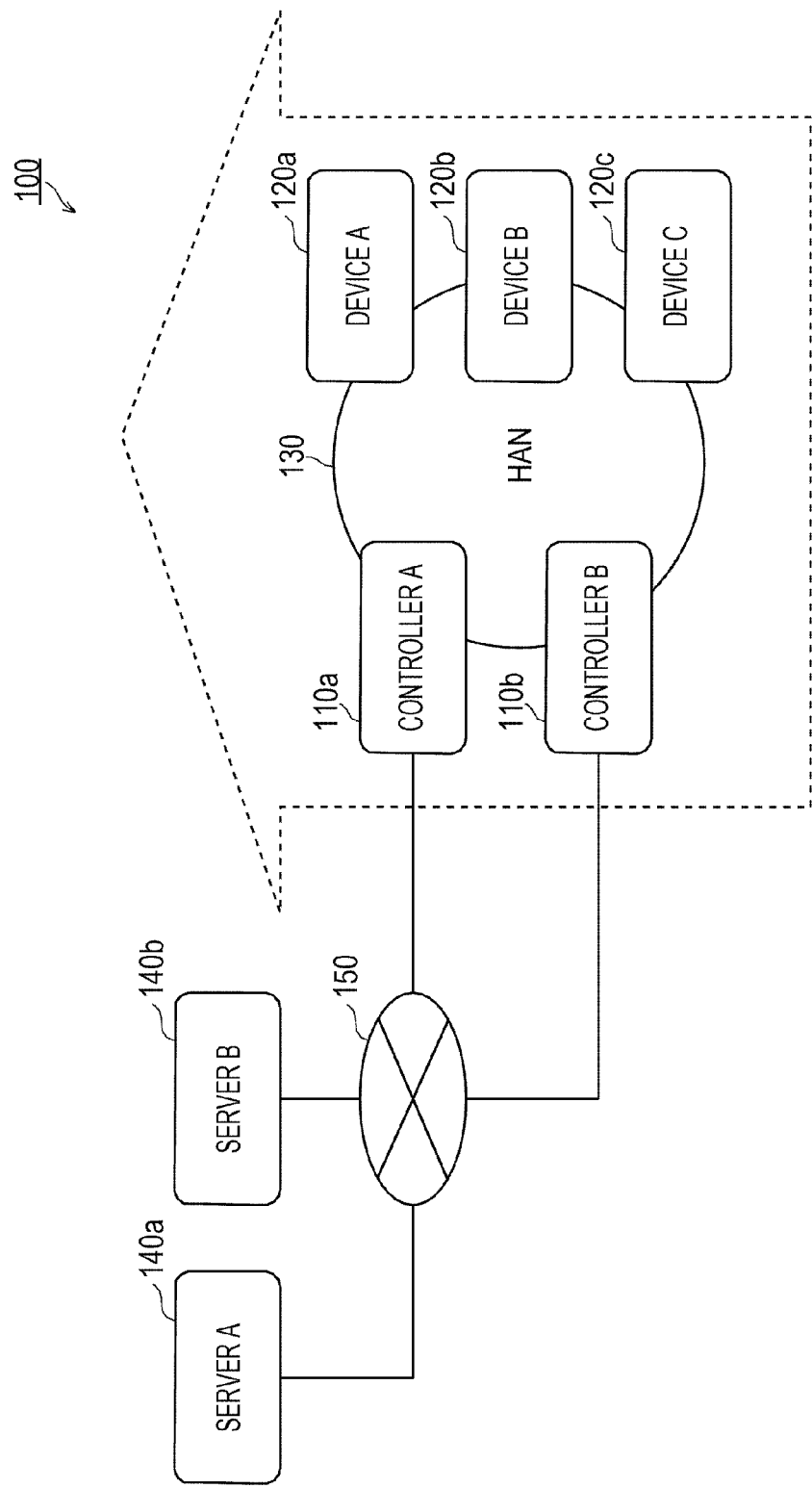
FIG. 1 is a diagram illustrating an example of an authentication system.

FIG. 1 is a diagram illustrating a configuration of the authentication system 100. The authentication system 100 includes controllers 110 (a controller A 110a and a controller B 110b) and devices 120 (a device A 120a, a device B 120b, and a device C 120c) on a HAN 130. The controllers 110 are connected to servers 140 (a server A 140a and a server B 140b) via a network 150.

The devices 120 are home appliances, AV devices, and residential facility devices having a network connection function and are, for example, a television, a recorder, an air-conditioner, a refrigerator, and a storage battery. The controllers 110 are devices having a function of controlling the devices 120. The controllers 110, for example, generate a control command in response to a request from the servers 140 or the like and transmit the generated control command to the devices 120 to cause the devices 120 to execute the control command. The controllers 110 also have a function of transmitting information accumulated in the devices 120 to the servers 140. Note that each of the controllers 110 controls the devices 120 that have been registered by pairing and that each of the devices 120 executes a control command transmitted from the controller 110 registered by pairing.

The HAN 130 is a wired or wireless network constructed in a home. Specifically, the HAN 130 is implemented by using Ethernet (registered trademark), specified low power radio, Wi-Fi (registered trademark), Bluetooth (registered trademark), power line communication, and the like. In addition, the network 150 is a network constructed, for example, between a home and a company, such as so-called the Internet.

In the authentication system 100, the one or more controllers 110 and the one or more devices 120 that have been paired with the one or more controllers 110 are on the HAN 130 and form one group in which a single group key is shared. The group key is generated by each of the controllers 110 and is distributed from the controller 110 to each of the devices 120 when the controller 110 and the device 120 perform an authentication process, for example.

Figure 2:
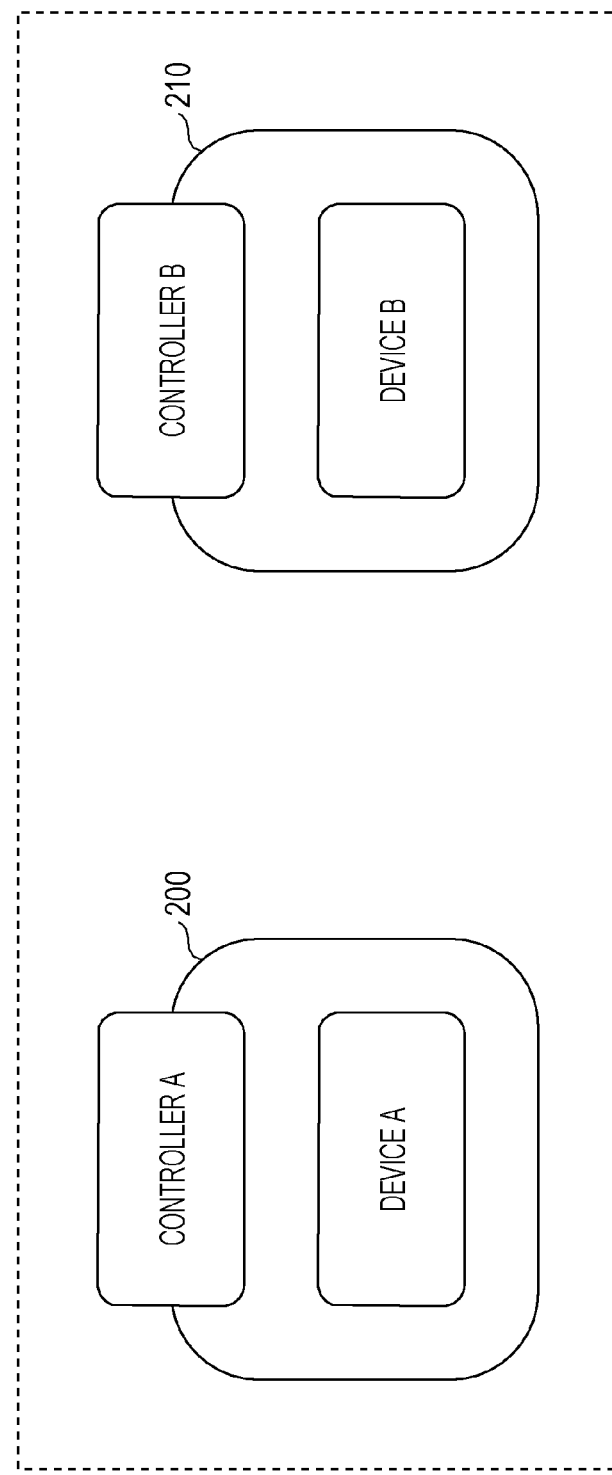
FIG. 2 is a diagram illustrating an example of a group configuration in a HAN (Home Area Network)

FIG. 2 is a diagram illustrating an example of a group configuration of the controllers 110 and the devices 120 on the HAN 130. FIG. 2 illustrates a group 200 to which the controller A and the device A belong and a group 210 to which the controller B and the device B belong. Different group keys are shared in the group 200 and the group 210. Accordingly, even if the group 200 and the group 210 use the same communication scheme, content communicated within each group does leak to outside the group.

Figure 3:
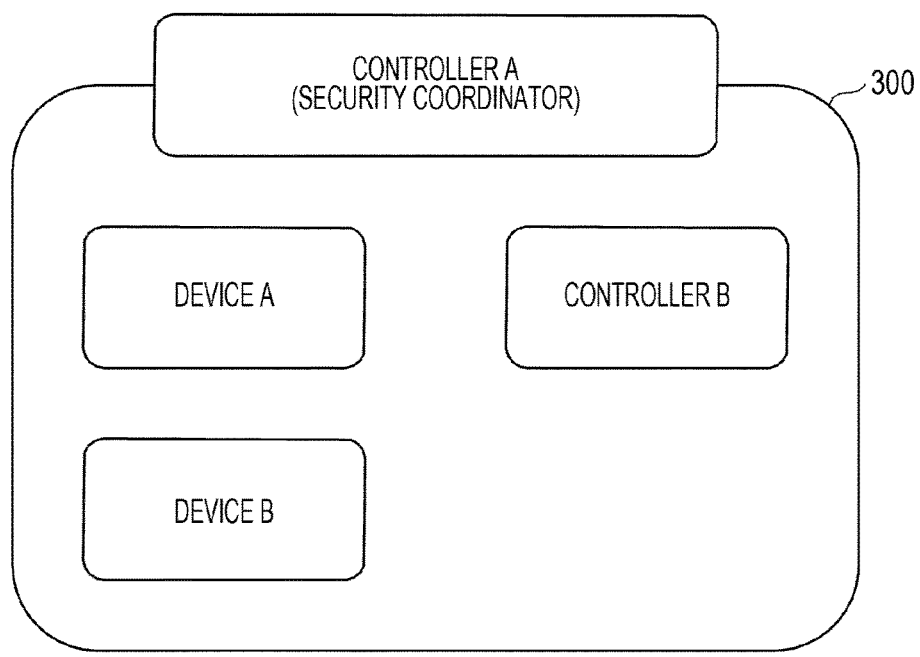
FIG. 3 is a diagram illustrating an example of a group configuration after the merger.

In the authentication system 100, if pairing takes place between a device and a controller that belong to different groups, the two groups are merged. For example, if pairing is performed for the device A and the controller B in the group configuration state illustrated in FIG. 2, the group configuration is modified as illustrated in FIG. 3. At that time, in the authentication system 100, one of the controllers is selected as a controller that performs an authentication process and a group key management process, and the selected controller is in charge of generation and distribution of a group key. In the present disclosure, the controller that performs an authentication process and a group key management process is referred to as an SC (Security Coordinator). In addition, devices and controllers other than the SC are sometimes referred to as nodes. In the example illustrated in FIG. 3, the controller A is selected as the SC. That is, in a group 300, only the controller A which is the SC performs an authentication process with each device and generates and distributes a group key, and the controller B does not perform these processes. The controller B controls the devices A and B that have been paired with the controller B, by using the group key generated and distributed by the controller A serving as the SC.

<Configurations>

Configurations of the controller 110 and the device 120, which are major components of the authentication system 100, will be described next.

<Configuration of Controller>

The configuration of the controller 110 will be described first with reference to FIGS. 4 to 7.

Figure 4:
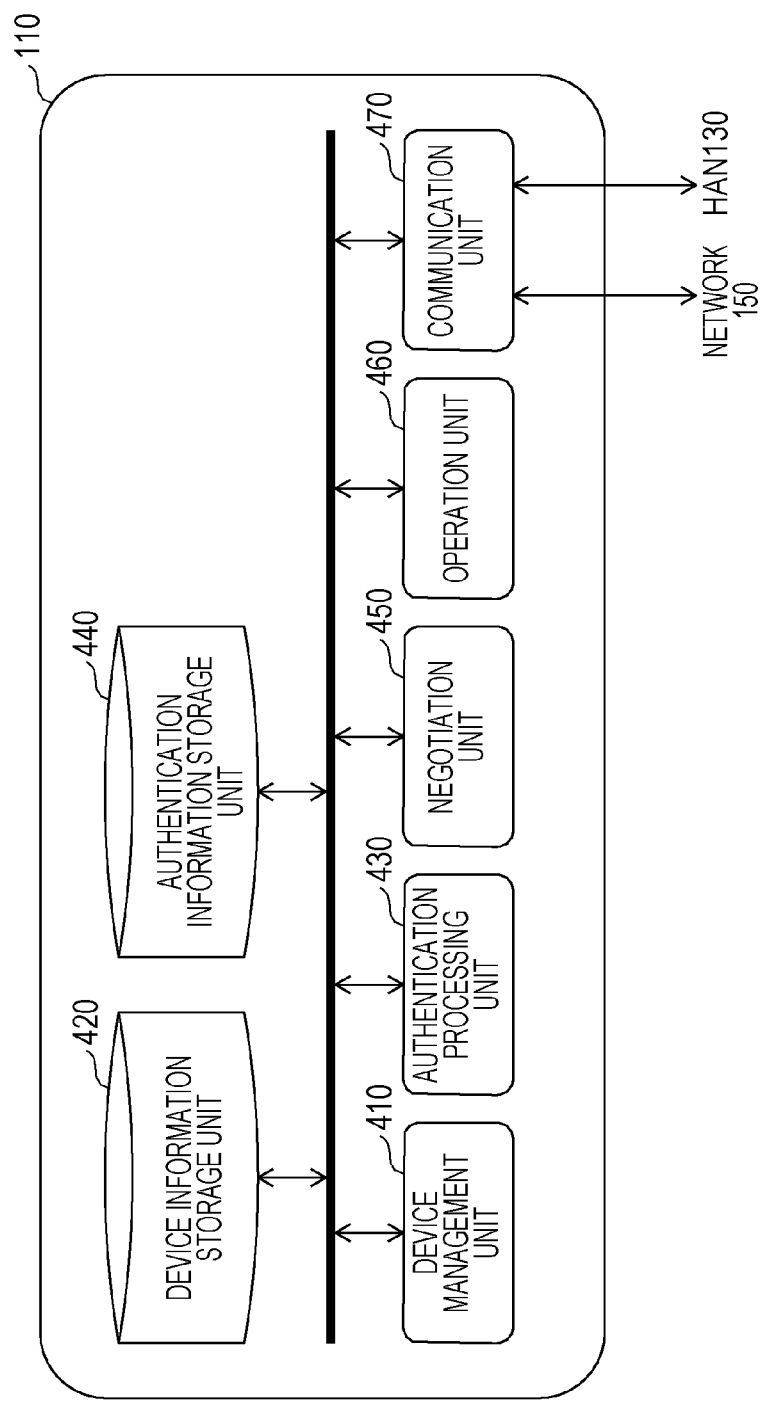
FIG. 4 is a diagram illustrating an example of a functional configuration of a controller.

FIG. 4 is a diagram illustrating a functional configuration of the controller 110. The controller 110 includes a device management unit 410, a device information storage unit 420, an authentication processing unit 430, an authentication information storage unit 440, a negotiation unit 450, an operation unit 460, and a communication unit 470.

The device management unit 410 manages the devices 120 and the other controllers 110 connected thereto (the controller 110). The device management unit 410 has functions of accepting a pairing request and a mutual authentication request from the devices 120 and the other controllers 110 via the communication unit 470 and a group key update request from the device information storage unit 420, of requesting the authentication processing unit 430 or the corresponding unit to perform a process corresponding to each of the requests, and of updating a connected device management table 500 and group-relating information 510 stored on the device information storage unit 420 in accordance with the result of the request.

FIGS. 5A and 5B are diagrams illustrating examples of the connected device management table 500 and the group-relating information 510 stored on the device information storage unit 420, respectively. FIG. 5A is a diagram illustrating an example of the connected device management table 500 stored in the controller 110. FIG. 5B is a diagram illustrating an example of the group-relating information 510 stored in the controller 110.

The connected device management table 500 stores, for each of the devices 120 (or the other controllers 110) connected thereto (the controller 110), a device ID 501, a certificate ID 502, a shared key 503, a group key 504, a group key validity period 505, and a group key update flag 506. The device ID 501 is information for uniquely identifying the device 120. The certificate ID 502 is a certificate ID of a public key certificate of the device 120. The shared key 503 is data of the shared key shared with the device 120. The group key 504 is data of the group key set for the device 120. The group key validity period 505 is a remaining time period for which the group key set for the device 120 is valid. The group key update flag 506 is flag information indicating whether the group key for the device 120 has been updated to the latest one.

The group-relating information 510 stores a control-target device 511, an SC 512, and a device under the control 513. The control-target device 511 indicates a device ID of the device 120 that has been paired with the controller 110. The SC 512 indicates a device ID of the SC of the group to which the controller 110 belongs. It is assumed that a value of the device ID of the controller 110 is set as the SC 512 in the controller 110 when the controller 110 is shipped. The device under the control 513 indicates the device ID of each of the devices 120 and the other controllers 110 that belong to the group when the controller 110 is the SC.

The device information storage unit 420 has functions of counting down the value of the group key validity period 505 as the time passes and of sending a group key update request to the device management unit 410 upon the value of the group key validity period 505 becoming less than or equal to a predetermined value. The predetermined value may be, for example, a 10% value of the initially set value or a value twice as large as a period necessary for updating of the group key.

Referring back to FIG. 4, the description of the configuration of the controller 110 is continued.

The authentication processing unit 430 has a function of performing an authentication process with each of the devices 120 and the other controllers 110 in response to a request from the device management unit 410. The details of the authentication process performed by the authentication processing unit 430 will be described later.

The authentication information storage unit 440 stores a secret key and a public key certificate thereof (the controller 110). The authentication information storage unit 440 also stores a CRL (Certificate Revocation List) used to check that the public key certificate of a counterpart device has not been revoked and a digital certificate including a public key of a certificate authority. It is assumed that a key pair of the secret key and the public key certificate, the CRL, and the digital certificate are pre-stored when the controller 110 is shipped.

Figure 6:
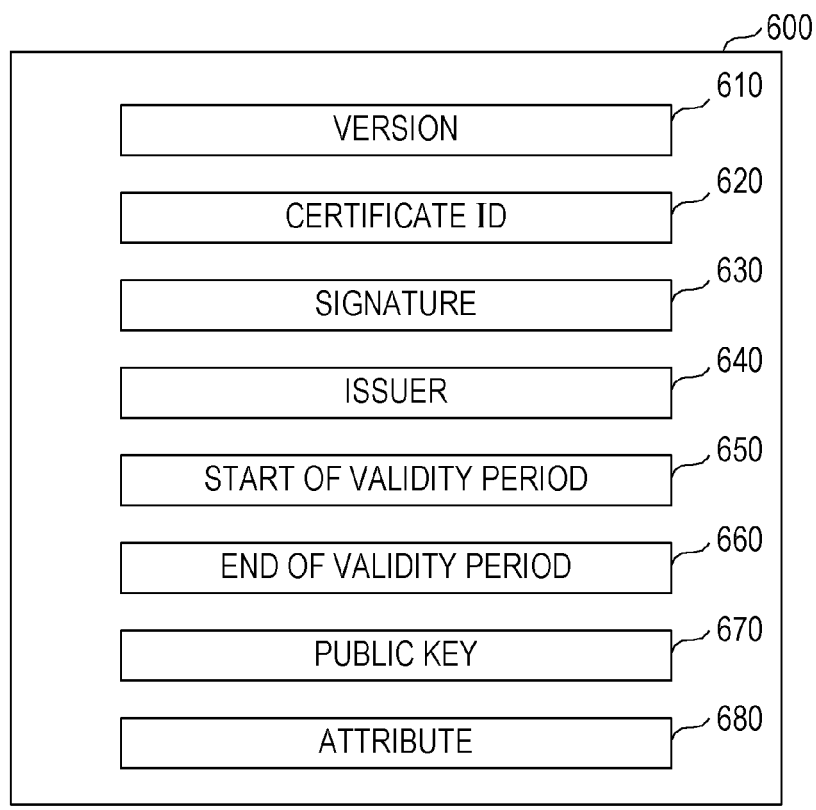
FIG. 6 is a diagram illustrating an example of a public key certificate.

FIG. 6 is a diagram illustrating an example of a data structure of a public key certificate 600 stored on the authentication information storage unit 440. The public key certificate 600 includes data of a version 610, a certificate ID 620, a signature 630, an issuer 640, the start of validity period 650, the end of validity period 660, a public key 670, and an attribute 680, for example.

Figure 7:
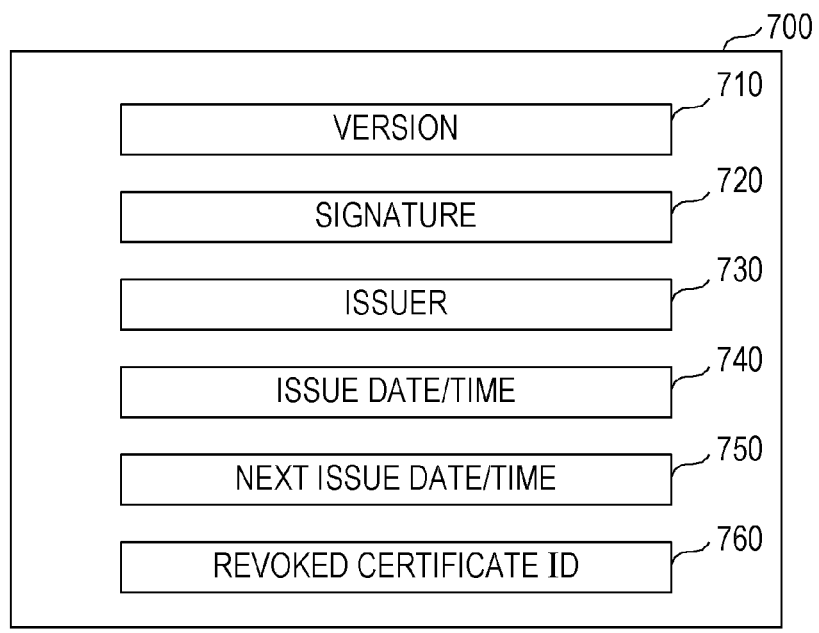
FIG. 7 is a diagram illustrating an example of a CRL (Certificate Revocation List)

FIG. 7 illustrates an example of a data structure of a CRL 700 stored on the authentication information storage unit 440. The CRL 700 includes data of a version 710, a signature 720, an issuer 730, an issue date/time 740, a next issue date/time 750, and a revoked certificate ID 760, for example.

Referring back to FIG. 4, the description of the configuration of the controller 110 is continued.

For example, when pairing takes place between devices belonging to different groups in the case where one group includes the plurality of controllers 110, the negotiation unit 450 performs a negotiation process in which communication is performed between the controller 110 and the other controller 110 and a controller serving as the SC is selected. The details of the negotiation process performed by the negotiation unit 450 will be described later.

The functional units, i.e., the device management unit 410, the device information storage unit 420, the authentication processing unit 430, the authentication information storage unit 440, and the negotiation unit 450, are typically implemented as a result of a processor executing a program stored on a memory.

The operation unit 460 includes a button for pairing and a control circuit that generates an interrupt signal in response to pressing of the button and delivers the interrupt signal to the processor.

The communication unit 470 is implemented by a communication LSI (Large Scale Integration) having a communication function. The communication unit 470 is connected to the HAN 130 and the network 150 and has a function of communicating, via the HAN 130, with the devices 120 and the other controllers 110 connected to the HAN 130 and a function of communicating with the servers 140 via the network 150. Note that the controllers 110 may be connected to the network 150 via a gateway device not illustrated.

The communication unit 470 appropriately performs encrypted communication by using a group key received from the authentication processing unit 430 during communication with the devices 120 and the other controllers 110. In addition, the communication unit 470 performs SSL (Secure Socket Layer) communication during communication with the servers 140. Note that a certificate or the like necessary for SSL communication is stored on the communication unit 470.

<Configuration of Device>

The configuration of the device 120 will be described next with reference to FIGS. 8 to 9B.

Figure 8:
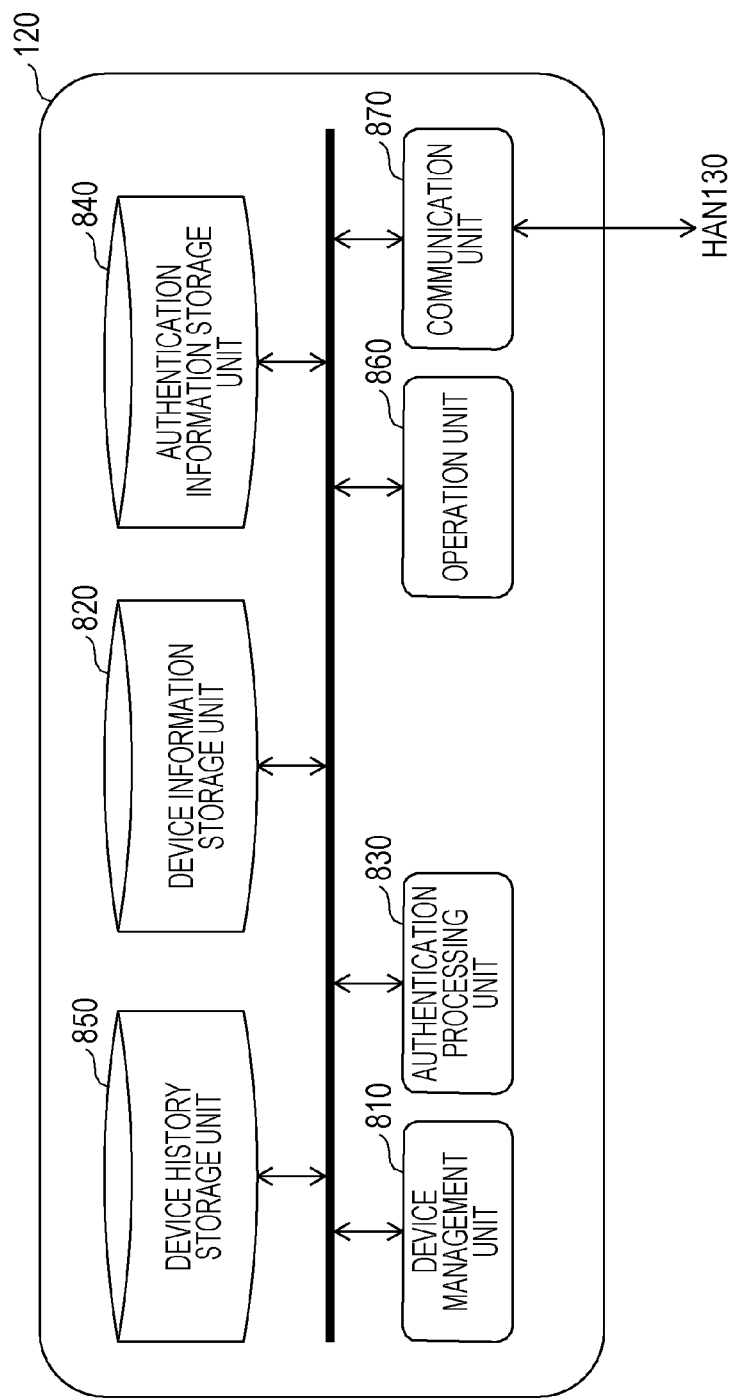
FIG. 8 is a diagram illustrating an example of a functional configuration of a device.

FIG. 8 is a diagram illustrating a functional configuration of the device 120. The device 120 includes a device management unit 810, a device information storage unit 820, an authentication processing unit 830, an authentication information storage unit 840, a device history storage unit 850, an operation unit 860, and a communication unit 870.

The device management unit 810 manages the controller 110 connected thereto (the device 120). The device management unit 810 has a function of starting a registration mode in response to an interrupt signal from the operation unit 860 and transmitting a pairing request to the controller 110 and a function of updating a connected controller management table 900 and group-relating information 910 stored on the device information storage unit 820 in accordance with a result of processing performed by the authentication processing unit 830 or the other unit. The device management unit 810 also has a function of encrypting device history information stored on the device history storage unit 850 by using a group key and transmitting the encrypted device history information to the server 140 via the controller 110 on a regular or irregular basis.

Figures 9A, 9B:
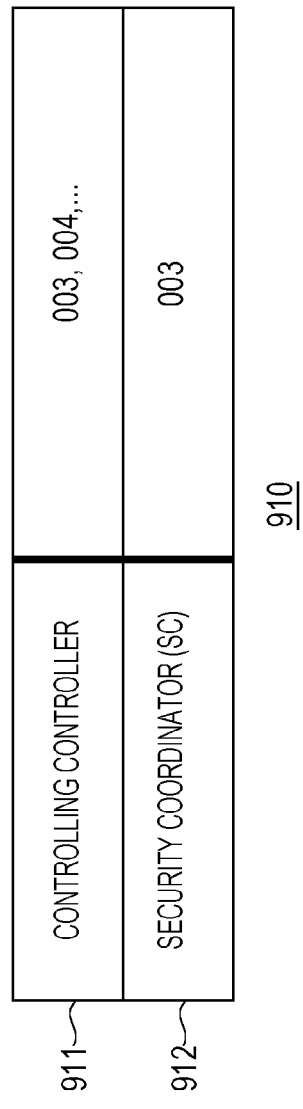
FIGS. 9A and 9B are diagrams illustrating examples of a connected controller management table and group-relating information stored in the device, respectively.

FIGS. 9A and 9B are diagrams illustrating examples of the connected controller management table 900 and the group-relating information 910 stored on the device information storage unit 820, respectively. FIG. 9A is a diagram illustrating an example of the connected controller management table 900 stored by the device 120. FIG. 9B is a diagram illustrating an example of the group-relating information 910 stored by the device 120.

The connected controller management table 900 stores, for each of the controllers 110 connected thereto (the device 120), a controller ID 901, a certificate ID 902, a shared key 903, and a group key 904. The controller ID 901 is information for uniquely identifying the controller 110. The certificate ID 902 is a certificate ID of a public key certificate of the controller 110. The shared key 903 is data of a shared key shared with the controller 110. The group key 904 is data of a group key received from the controller 110. Note that the shared key is not shared with all the controllers but rather is shared only with the SC.

The group-relating information 910 stores a controlling controller 911 and an SC 912. The controlling controller 911 indicates a device ID of the controller 110 that has been paired with the device 120. The SC 912 indicates a device ID of the SC of a group to which the device 120 belongs. Note that a value indicating that no SC has been registered is set as the SC 912 in the device 120 when the device 120 is shipped.

Referring back to FIG. 8, the description of the configuration of the device 120 is continued.

The authentication processing unit 830 has a function of performing an authentication process with the controller 110. The details of the authentication process performed by the authentication processing unit 830 will be described later.

The authentication information storage unit 840 stores a secret key and a public key certificate thereof (the device 120). The authentication information storage unit 840 also stores a CRL (Certificate Revocation List) and a digital certificate including a public key of a certificate authority. Since the structures of the public key certificate and the CRL are the same as those of the public key certificate and the CRL stored in the controller 110, a description thereof is omitted here. Note that a key pair of the secret key and the public key certificate, the CRL, and the digital certificate are pre-stored when the device 120 is shipped.

The device history storage unit 850 stores device history information representing an operation history thereof (the device 120).

The functional units, i.e., the device management unit 810, the device information storage unit 820, the authentication processing unit 830, the authentication information storage unit 840, and the device history storage unit 850, are typically implemented as a result of a processor executing a program stored on a memory.

The operation unit 860 includes a button for pairing and a control circuit that generates an interrupt signal in response to pressing of the button and delivers the interrupt signal to the processor.

The communication unit 870 is implemented by a communication LSI (Large Scale Integration) having a communication function. The communication unit 870 is connected to the HAN 130 and has a function of communicating, via the HAN 130, with the controllers 110 connected to the HAN 130.

The communication unit 870 appropriately performs encrypted communication by using a group key or the like received from the authentication processing unit 830 during communication with the controller 110.

<Operations>

A device registration process, a negotiation process, an SC handover process, a mutual authentication process, a shared key computation process, a group key distribution/reception process, a group key updating process, a device history information transmission process, and a control command transmission process performed by the authentication system 100 will be sequentially described below.

<Device Registration Process>

The device registration process is a process performed when a controller and a device are paired with each other. The device registration process will be described below with reference to FIG. 10. It is assumed in the following description that the device A and the controller B perform the device registration process.

(S1000) A user presses the pairing button of the device A and the pairing button of the controller B. In response to this action, each of the device A and the controller B starts the registration mode.

(S1005) The device A transmits a connection request to the controller B. At that time, the device A also transmits the device ID of the SC set therein. When no SC is set in the device A, information indicating so is transmitted.

(S1010) The controller B determines whether the negotiation process is needed on the basis of the device ID of the SC set therein and the device ID of the SC which the controller B is notified of by the device A. The negotiation process is needed in the authentication system 100 if different controllers are set as the SC in the device A and the controller B. Conversely, the negotiation process need not be performed when no SC is set in the device A and when the same controller is set as the SC in the device A and the controller B.

(S1015) If it is determined in step S1010 that the negotiation process is needed, the negotiation process is performed between the controller set as the SC in the device A and the controller set as the SC in the controller B.

When the controller B performs the negotiation process, the controller B transmits a negotiation request to a counterpart controller of the negotiation process to start the negotiation process. When the controller B does not perform the negotiation process, the controller B transmits a negotiation request to the two controllers that perform the negotiation process. The details of the negotiation process will be described later.

(S1020) The controller B transmits the device ID of the SC to the device A. If it is determined in step S1010 that the negotiation process is not needed, the controller B notifies the device A of the device ID of the SC set therein. If it is determined in step S1010 that the negotiation process is needed, the controller B obtains the device ID of the controller selected as an incoming SC as a result of the negotiation process and transmits the device ID to the device A.

(S1025) Each of the device A and the controller B determines whether authentication with the SC is needed. For example, if the device ID which the device A is notified of by the controller B in step S1020 differs from the device ID of the controller currently set as the SC in the device A or if the device A does not share the group key generated by the SC which the device A is notified of by the controller B, the device A determines that authentication is needed. For example, if the device ID transmitted to the device A in step S1020 differs from the device ID of the controller currently set as the SC in the controller B or if the controller B does not share the group key generated by the SC which the controller B has notified the device A of, the controller B determines that authentication is needed.

(S1030, S1035) If it is determined in step S1025 that authentication is needed, the device A or the controller B performs the mutual authentication process and the group key distribution/reception process, which will be described later, with the incoming SC.

(S1040) After the mutual authentication process and the group key distribution/reception process have successfully ended, the device A or the controller B performs a process of placing itself under the control of the incoming SC. The device A sets the device ID of the incoming SC as the SC 912 of the group-relating information 910 stored on the device information storage unit 820 or the controller B sets the device ID of the incoming SC as the SC 512 of the group-relating information 510 stored on the device information storage unit 420. Then, the device A or the controller B transmits the device ID thereof to the incoming SC, and the SC sets the received device ID as the device under the control 513 of the group-relating information 510 stored on the device information storage unit 420.

(S1045) After the device A or the controller B has successfully finished the mutual authentication process and the group key distribution/reception process, the device A transmits a pairing request to the controller B. At that time, the device A also transmits the device ID thereof.

(S1050) Upon receipt of the pairing request from the device A, the controller B performs pairing with the device A. Specifically, the controller B sets the device ID received from the device A together with the pairing request as the control-target device 511 of the group-relating information 510 stored on the device information storage unit 420.

(S1055) After performing pairing with the device A, the controller B transmits a pairing request to the device A. At that time, the controller B also transmits the device ID thereof.

(S1060) Upon receipt of the pairing request from the controller B, the device A performs pairing with the controller B. Specifically, the device A sets the device ID received from the controller B together with the pairing request as the controlling controller 911 of the group-relating information 910 stored on the device information storage unit 820.

(S1065) After the device A and the controller B have successfully finished mutual pairing, the device A and the control B end the registration mode and notify the other devices and controllers belonging to the same group that the device A and the controller B have been paired. This notification is transmitted over simultaneous broadcasting (multicasting) by encrypting the content by using the group key shared in step S1035.

The above is the device registration process performed between the device A and the controller B.

Figure 11:
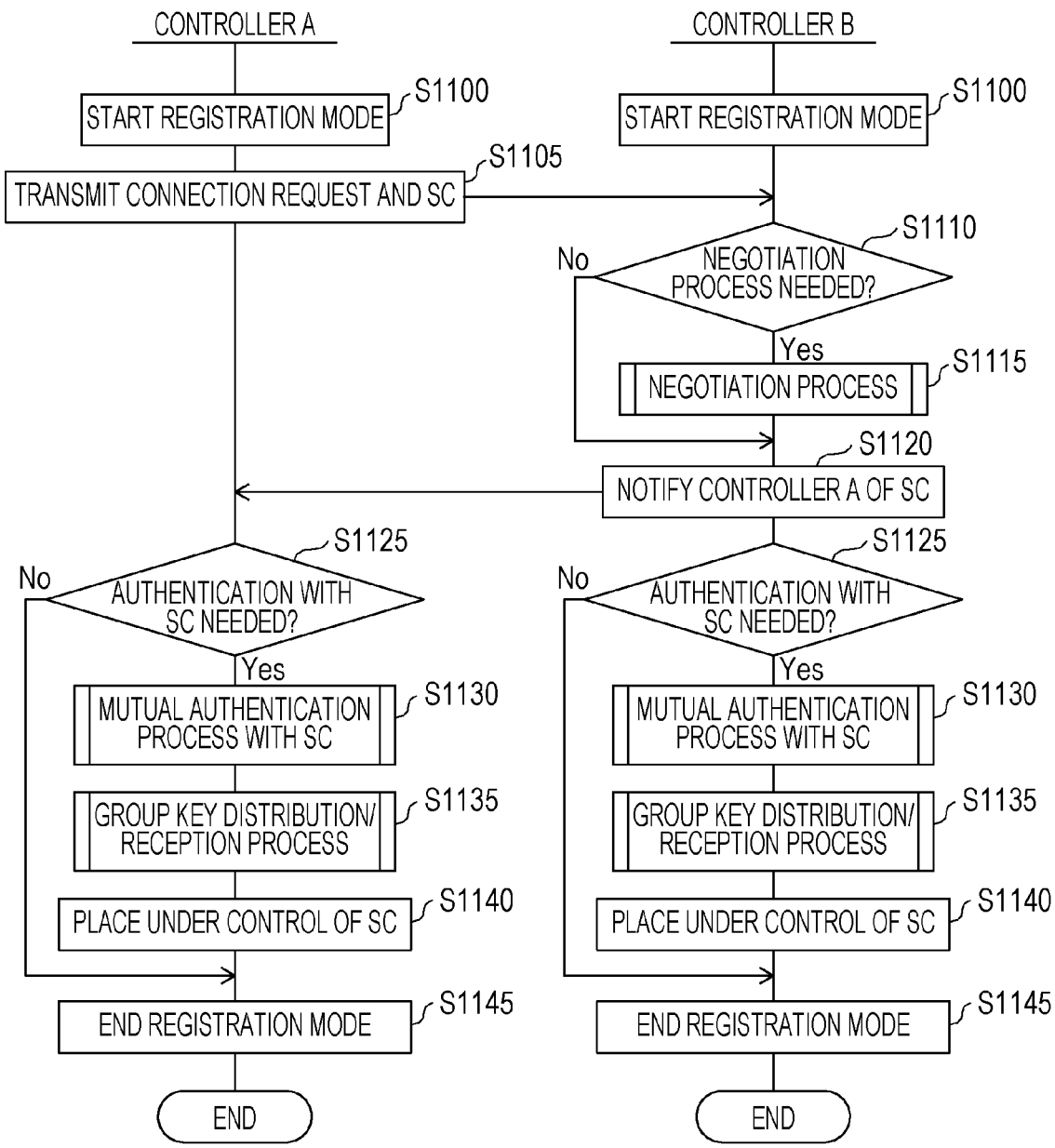

FIG. 11 illustrates the device registration process that is performed between the controller A and the controller B. The device registration process performed between the controller A and the controller B is substantially the same as the device registration process performed between the device A and the controller B except that the processing of steps S1045, S1050, S1055, and S1060 is not performed, and thus a description thereof is omitted.

<Negotiation Process>

The negotiation process is a process that is performed when pairing takes place between a device and a controller belonging to different groups and that determines which controller serves as the SC after the two groups are merged. The negotiation process will be described below with reference to FIG. 12. It is assumed below that the controller A and the controller B perform the negotiation process.

(S1200) The controller A transmits a negotiation request and the public key certificate to the controller B.

(S1205) The controller A and the controller B perform the mutual authentication process described later.

(S1210) If the mutual authentication process has ended successfully, the controller A obtains the controller attribute from the public key certificate of the controller A and the public key certificate of the controller B that has been obtained during the mutual authentication process.

(S1215) The controller A determines whether the attribute of the controller A indicates "dedicated device". If the attribute of the controller A indicates "dedicated device", the process proceeds to step S1235; otherwise, the process proceeds to step S1220.

(S1220) The controller A determines whether the attribute of the controller B indicates "dedicated device". If the attribute of the controller B indicates "dedicated device", the process proceeds to step S1240; otherwise, the process proceeds to step 1225.

(S1225) The controller A determines whether the attribute of the controller A indicates "general-purpose device". If the attribute of the controller A indicates "general-purpose device", the process proceeds to step S1235; otherwise, the process proceeds to step S1230.

(S1230) The controller A determines whether the attribute of the controller B indicates "general-purpose device". If the attribute of the controller B indicates "general-purpose device", the process proceeds to step S1240; otherwise, the process proceeds to step S1235.

(S1235) The controller A selects the controller A as the SC.

(S1240) The controller A selects the controller B as the SC.

(S1245) The controller A notifies the controller B of the SC selection result.

(S1250) The controller A and the controller B perform the SC handover process described later.

The above is the negotiation process.

In the negotiation process, data of the attribute among the items of the public key certificate is referred to, and the priority for becoming the SC is changed depending on whether the controller is a "dedicated device" having only a function of controlling other devices, a "general-purpose device" also having other functions, or an "app" running on a PC or smartphone. If the attribute of the controller indicates "dedicated device", the controller presumably has a function of always being in standby to be able to quickly perform processing at any time. If the attribute of the controller indicates "general-purpose device", the controller may be possibly powered off when nobody is at the home or while people are sleeping. If the attribute of the controller indicates "app", the controller can be powered off or disconnected from the network at any time. Accordingly, the priority is set such that the "dedicated device", the "general-purpose device", and the "app" are selected as the SC in this order. The case where the controller that has transmitted a request for the negation process is preferentially selected as the SC if the controllers have the same attribute has been described herein; however, the controller B that has received the request for the negotiation process may be preferentially selected as the SC.

<SC Handover Process>

Figure 13:
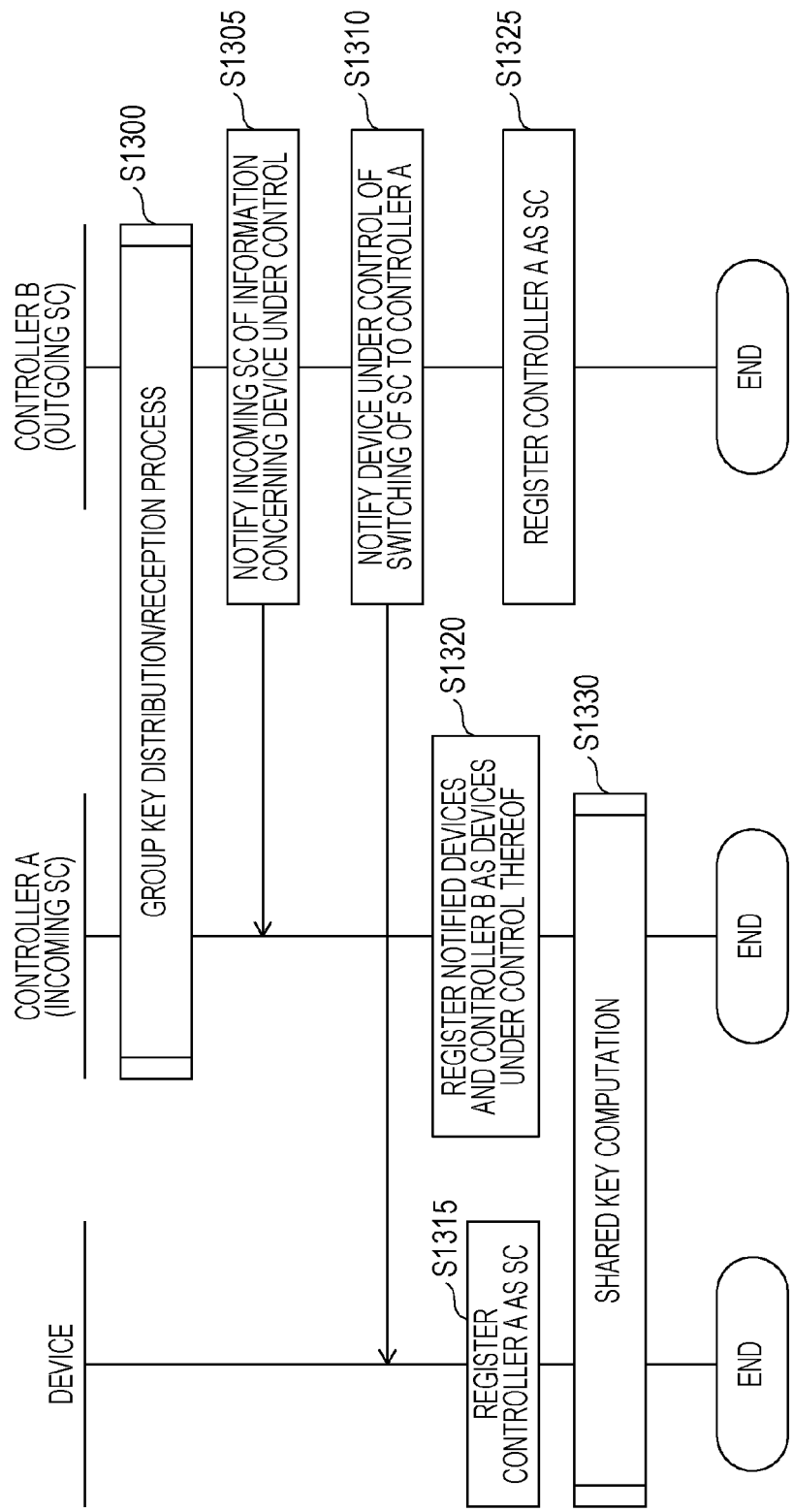
FIG. 13 is a sequence diagram illustrating an example of an SC (Security Coordinator) handover process.

The SC handover process is a process in which information stored in the controller that has been the SC is handed over to the incoming SC after the incoming SC is selected by the negotiation process. The SC handover process will be described below with reference to FIG. 13. It is assumed below that the SC handover process is performed between the controller A (incoming SC) that has been newly selected as the SC and the controller B (outgoing SC) that has been the SC.

(S1300) The incoming SC and the outgoing SC perform the group key distribution/reception process described later. In this step, the group key managed by the outgoing SC is distributed to the incoming SC.

(S1305) The outgoing SC transmits information concerning the devices under the control thereof to the incoming SC. Specifically, the outgoing SC transmits, for each of the devices indicated by the device under the control 513 of the group-relating information 510 stored therein, data of the device ID 501, the certificate ID 502, the group key 504, and the group key validity period 505 in the connected device management table 500. At that time, the outgoing SC also transmits the public key certificates of the devices under the control thereof. Note that when the outgoing SC transmits the group key to the incoming SC, the outgoing SC encrypts the group key by using the shared key shared with the incoming SC before transmission.

(S1310) The outgoing SC notifies the devices under the control thereof that the SC is switched from the controller B to the controller A. At that time, the outgoing SC also transmits the device ID and the public key certificate of the controller A.

(S1315) Upon receipt of the SC switching notification, the device ID, and the public key certificate from the outgoing SC, the devices under the control of the outgoing SC register the controller A as the SC. Specifically, the devices under the control of the outgoing SC register the received device ID of the controller A as the SC 912 of the group-relating information 910 stored on the device information storage unit 820. The devices under the control of the outgoing SC further add a record of the received device ID of the controller A to the connected controller management table 900.

(S1320) The incoming SC updates the connected device management table 500 and the group-relating information 510 stored on the device information storage unit 420 by using the group key received through the group key distribution/reception process in step S1300 and the information concerning the devices received in step S1305.

(S1325) The outgoing SC registers the controller A, which is the incoming SC, as the SC. Specifically, the outgoing SC sets the device ID of the controller A as the SC 512 of the group-relating information 510 stored on the device information storage unit 420.

(S1330) The devices under the control of the outgoing SC and the incoming SC perform the shared key computation process described later. The timing at which the shared key computation process is performed may be immediately after the devices under the control of the outgoing SC have registered the incoming SC as the SC; however, the timing may be any time before the incoming SC updates the group key.

The above is the SC handover process.

<Mutual Authentication Process>

Figure 14:
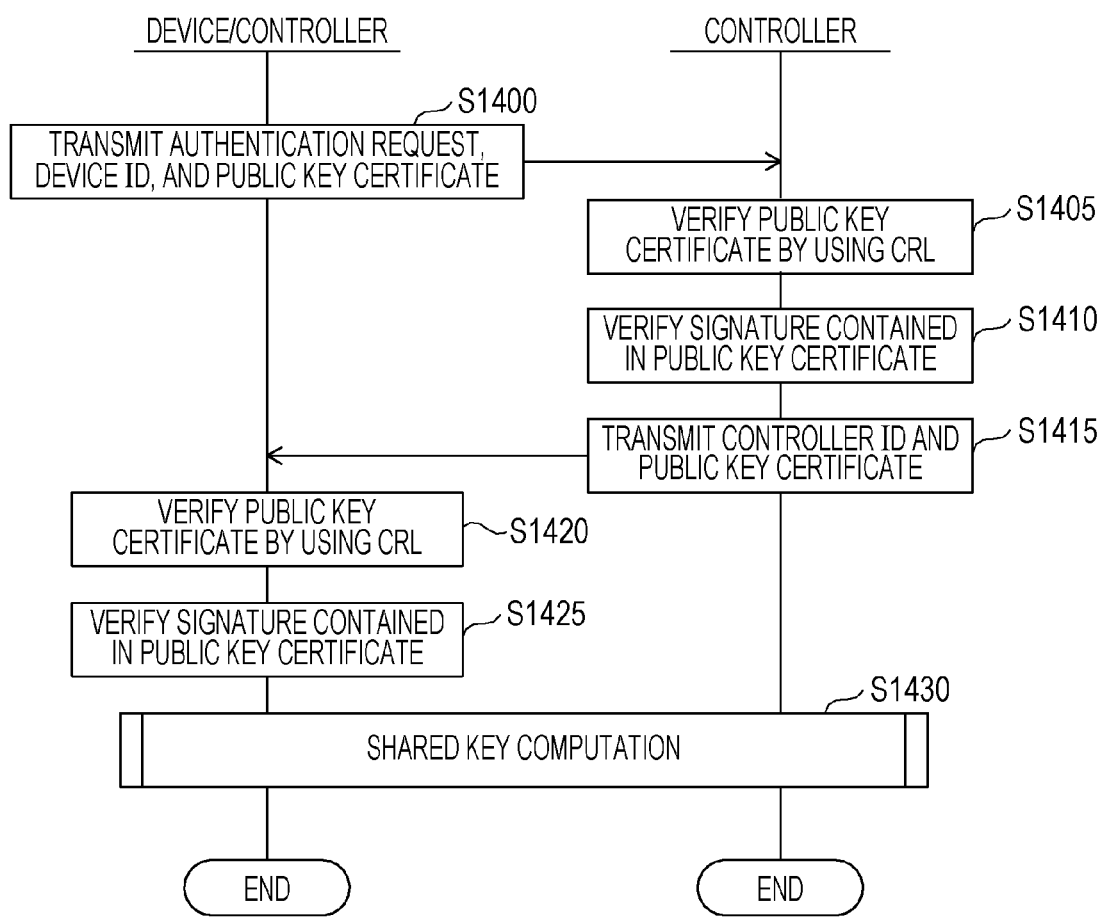
FIG. 14 is a sequence diagram illustrating an example of a mutual authentication process.

The mutual authentication process between a device and a controller or between a controller and a controller will be described next with reference to FIG. 14. Although the mutual authentication process between a device and a controller will be described below, a similar process is performed as the mutual authentication process between a controller and a controller.

(S1400) The device transmits an authentication request to the controller. At that time, the device also transmits the device ID and the public key certificate thereof.

(S1405) The controller verifies that the certificate ID of the public key certificate of the device is not on the CRL stored on the authentication information storage unit 440. If the verification fails, the controller notifies the device of an error and ends the process.

(S1410) After confirming that the certificate ID is not on the CRL, the controller verifies the signature contained in the public key certificate of the device by using the public key of a certificate authority. If the verification fails, the controller notifies the device of an error and ends the process. A commonly used method, such as ECDSA (Elliptic Curve Digital Signature Algorithm), RSA or DSA (Digital Signature Algorithm), can be utilized for the signature. After successfully verifying the signature contained in the public key certificate of the device, the controller also creates a new record in the connected device management table 500 and registers the device ID and the certificate ID of the device that is a counterpart of the mutual authentication process.

(S1415) After successfully verifying the signature contained in the public key certificate of the device, the controller transmits the device ID and the public key certificate thereof to the device.

(S1420) The device verifies that the certificate ID of the public key certificate of the controller is not on the CRL stored on the authentication information storage unit 840. If the verification fails, the device notifies the controller of an error and ends the process.

(S1425) After confirming that the certificate ID is not on the CRL, the device verifies the signature contained in the public key certificate of the controller by using the public key of the certificate authority. If the verification fails, the device notifies the controller of an error and ends the process. After successfully verifying the signature contained in the public key certificate of the controller, the device creates a new record in the connected controller management table 900 and registers the device ID and the certificate ID of the controller that is a counterpart of the mutual authentication process.

(S1430) The device and the controller perform the shared key computation process described later.

The above is the mutual authentication process.

<Shared Key Computation Process>

Figure 15:
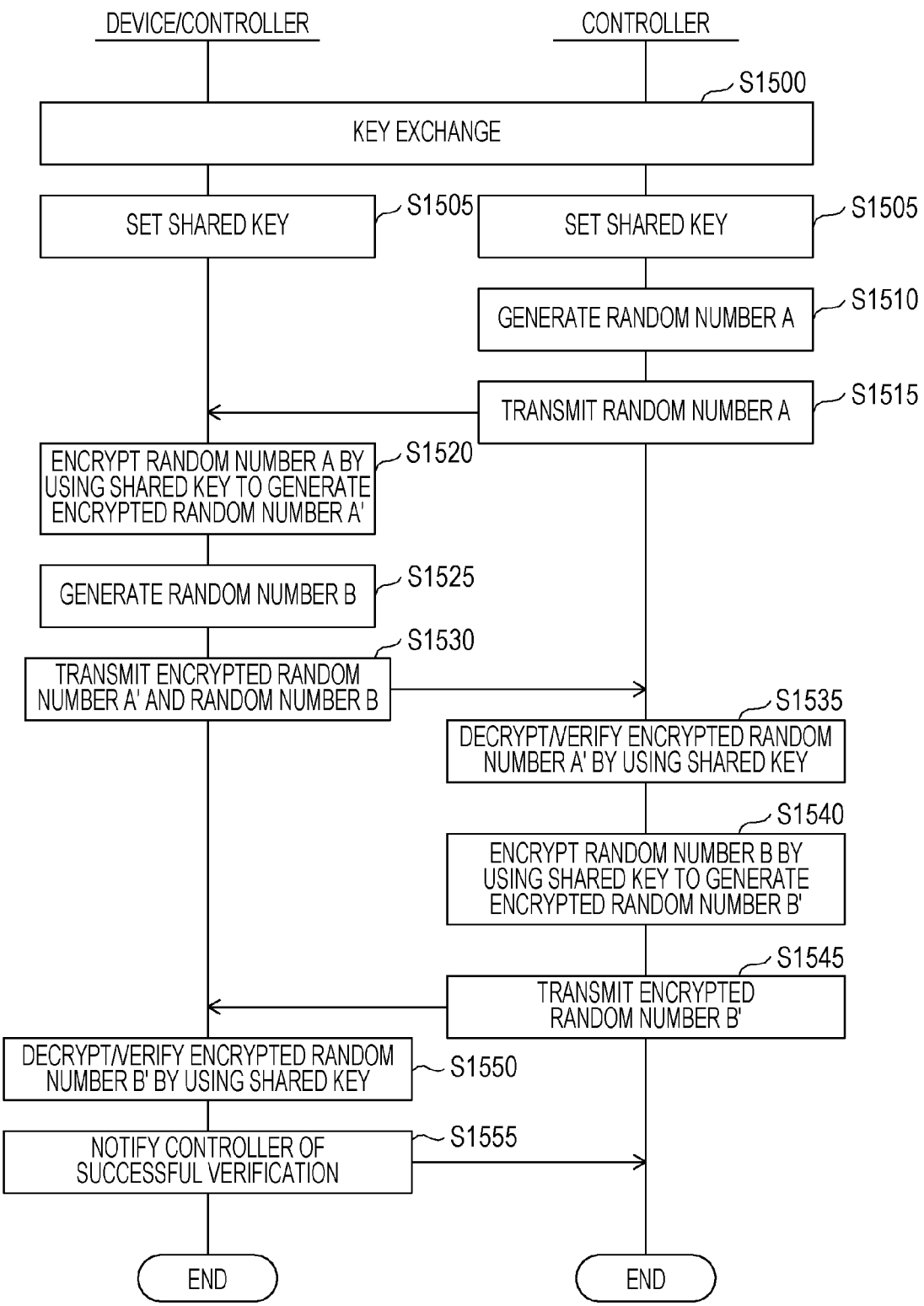
FIG. 15 is a sequence diagram illustrating an example of a common key computation process.

The shared key computation process between a device and a controller and between a controller and a controller will be described next with reference to FIG. 15. Although the shared key computation process between a device and a controller will be described below, a similar process is performed as the shared key computation process between a controller and a controller.

(S1500) The device and the controller perform key exchange. A commonly used method, such as ECDH (Elliptic Curve Diffie-Hellman key exchange), can be used as the method of key exchange. Types of ECDH include the Static method and the Ephemeral method. It is assumed in this embodiment that the Static method is used. Needless to say, the Ephemeral method may be used.

(S1505) The device and the controller compute a shared key. Specifically, the device and the controller compute a hash value of the value shared through the key exchange in step S1500 and use the most-significant 128 bits of the computed hash value as the shared key. It is assumed that AES (Advanced Encryption Standard) having a key size of 128 bits is used as an encryption method using a shared key in the authentication system 100; however, the encryption method used is not limited to this one and another encryption method may be used. The device registers the computed shared key as the shared key 903 of the record for the corresponding controller in the connected controller management table 900. The controller registers the computed shared key as the shared key 503 of the record for the corresponding device in the connected device management table 500. The corresponding controller and the corresponding device are the device and the controller that are counterparts in the shared key computation process.

(S1510, S1515) The controller generates a random number A and transmits the random number A to the device.

(S1520) The device encrypts the random number A received from the controller by using the shared key computed in step S1505 to generate an encrypted random number A'.

(S1525, S1530) The device generates a random number B and transmits the encrypted random number A' and the random number B to the controller.

(S1535) The controller decrypts the encrypted random number A' received from the device by using the shared key computed in step S1505 and verifies whether the decrypted random number matches the random number A generated in step S1510. If the verification fails, the controller notifies the device of an error and ends the process.

(S1540, S1545) The controller encrypts the random number B received from the device by using the shared key computed in step S1505 to generate an encrypted random number B' and transmits the encrypted random number B' to the device.

(S1550) The device decrypts the encrypted random number B' received from the controller by using the shared key computed in step S1505 and verifies whether the decrypted random number matches the random number B generated in step S1525. If the verification fails, the device notifies the controller of an error and ends the process.

(S1555) If the verification is successful, the device notifies the controller of a result indicating successful verification.

The above is the shared key computation process.

<Group Key Distribution/Reception Process>

Figure 16:
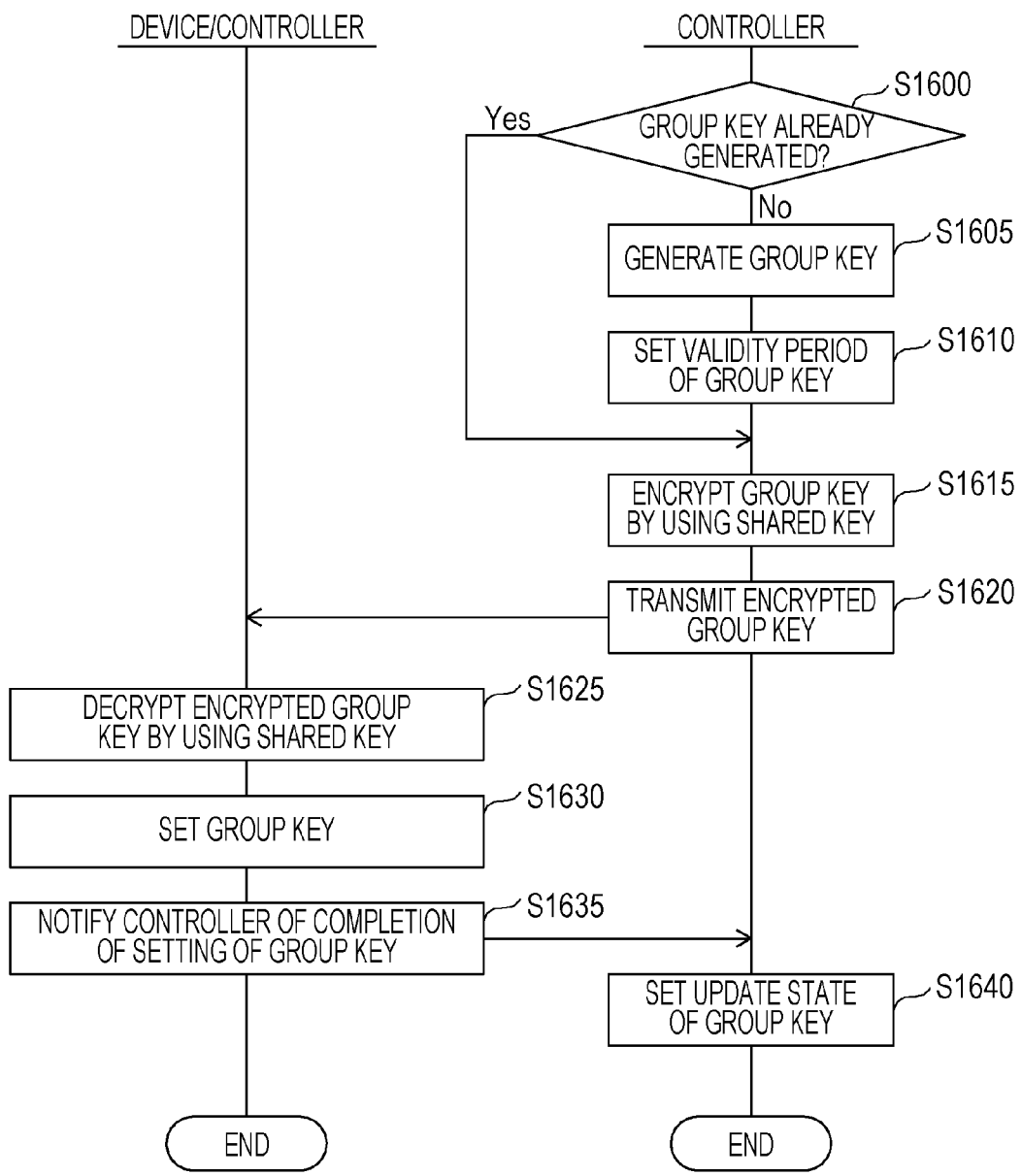
FIG. 16 is a sequence diagram illustrating an example of a group key distribution/reception process.

The group key distribution/reception process between a device and a controller serving as the SC and between a controller not serving as the SC and a controller serving as the SC will be described next with reference to FIG. 16. Although the group key distribution/reception process between a device and a controller serving as the SC will be described below, the group key distribution/reception process may be performed between a controller not serving as the SC and a controller serving as the SC. In such a case, the device is replaced with the controller not serving as the SC.

(S1600) The controller determines whether a group key has already been generated. If the group key has already been generated, the controller registers the already generated group key and the validity period of the group key in the record for the corresponding device in the connected device management table 500. The corresponding device is the device that is a counterpart in the group key distribution/reception process.

(S1605, S1610) If the group key has not been generated yet, the controller generates the group key and sets the validity period of the generated group key. It is assumed that AES having a key size of 128 bits is used as an encryption method using a group key in the authentication system 100; however, the encryption method used is not limited to this one and another encryption method may be used. The controller registers the generated group key and the validity period of the group key in a record for the corresponding device in the connected device management table 500.

(S1615, S1620) The controller encrypts the generated or already generated group key by using the shared key stored in the record for the corresponding device in the connected device management table 500 to generate an encrypted group key and transmits the encrypted group key to the device.

(S1625) The device decrypts the encrypted group key received from the controller by using the shared key stored in the record for the corresponding controller in the connected controller management table 900.

(S1630) The device registers the decrypted group key obtained in step S1625 in the record for the corresponding controller in the connected controller management table 900.

(S1635) The device notifies the controller that registration of the group key has completed.

(S1640) The controller registers a value indicating that the group key has been updated as the group key update flag 506 of the record for the corresponding device in the connected device management table 500.

The above is the group key distribution/reception process.

If the group key is shared between controllers, the validity period of the group key may be encrypted and transmitted when the group key is encrypted and transmitted in steps S1615 and S1620. In addition, the controller that has received the encrypted validity period of the group key may register the received validity period of the group key in the connected device management table 500.

<Group Key Updating Process>

The group key updating process between a controller serving as the SC and a device or controller under the control of the SC will be described next with reference to FIG. 17.

(S1700) The controller selected as the SC determines whether the group key validity period 505 in any one of the records of the connected device management table 500 is less than or equal to a predetermined value. The following processing is not performed until the group key validity period 505 becomes less than or equal to the predetermined value.

(S1705) Upon the group key validity period 505 in any one of the records of the connected device management table 500 becoming less than or equal to the predetermined value, the SC generates a new group key.

(S1710) The SC sets the validity period of the group key generated in step S1705. The validity period is set to a value, for example, 24 hours or 72 hours.

(S1715) The SC registers a value indicating that the group key has not been updated as the group key update flag 506 in all the records of the connected device management table 500.

(S1720) The SC selects a device (or controller) for which the group key is updated from among the devices and controllers under the control thereof.

(S1725) The SC encrypts the group key generated in step S1705 by using the shared key stored in the record for the device (or controller) selected in step S1720 in the connected device management table 500 to generate an encrypted group key.

(S1730) The SC transmits the encrypted group key generated in step S1725 to the device selected in step S1720 and updates the group key of the device (or controller) selected in step S1720. The details of the processing of step S1730 will be described later.

(S1735) The SC determines whether the group key has been updated for all the devices and controllers under the control thereof. If there is a device or controller for which the group key has not been updated, the process returns to step S1720; if the group key has been updated for all the devices and controllers under the control of the SC, the process proceeds to step S1740.

(S1740) The SC registers the group key generated in step S1705 as the group key 504 in all the records of the connected device management table 500. The SC registers the set validity period of the group key as the group key validity period 505 in all the records of the connected device management table 500.

The details of the processing of step S1730 will be described next with reference to FIG. 18. Although the processing between the device selected in step S1720 and the controller serving as the SC will be described below, the processing may be performed between a controller selected in step S1720 and the controller serving as the SC. In such a case, the device is replaced with the controller not serving as the SC.

(S1800, S1805) The SC generates a random number A and transmits the random number A to the device together with a group key update request.

(S1810) Upon receipt of the group key update request and the random number A from the SC, the device encrypts the random number A by using the shared key contained in the record for the SC in the connected controller management table 900 to generate an encrypted random number A'.

(S1815, S1820) The device generates a random number B and transmits the encrypted random number A' and the random number B to the SC.

(S1825) The SC decrypts the encrypted random number A' received from the device by using the shared key stored in the record for the corresponding device in the connected device management table 500 and verifies whether the decrypted random number matches the random number A generated in step S1800. If the verification fails, the SC notifies the device of an error and ends the process.

(S1830, S1835) The SC encrypts the random number B received from the device by using the shared key stored in the record for the corresponding device in the connected device management table 500 to generate an encrypted random number B' and transmits the encrypted random number B' to the device.

(S1840) The device decrypts the encrypted random number B' received from the SC by using the shared key stored in the record for the SC in the connected controller management table 900 and verifies whether the decrypted random number matches the random number B generated in step S1815. If the verification fails, the device notifies the SC of an error and ends the process.

(S1845) If the verification is successful, the device notifies the SC of a result indicating successful verification.

(S1850) Upon receipt of the result indicating successful verification from the device, the SC transmits the encrypted group key generated in step S1725 to the device.

(S1855) The device decrypts the encrypted group key received from the SC by using the shared key stored in the record for the SC in the connected controller management table 900.

(S1860) The device registers the decrypted group key as the group key 904 in all the records of the connected controller management table 900.

(S1865) The device transmits a group key update completion notification to the SC.

(S1870) Upon receipt of the group key update completion notification from the device, the SC registers a value indicating that the group key has been updated as the group key update flag 506 of the record for the corresponding device in the connected device management table 500.

The above is the group key updating process.

<Device History Information Transmission Process>

Figures 22A, 22B, 22C, 22D, 23:
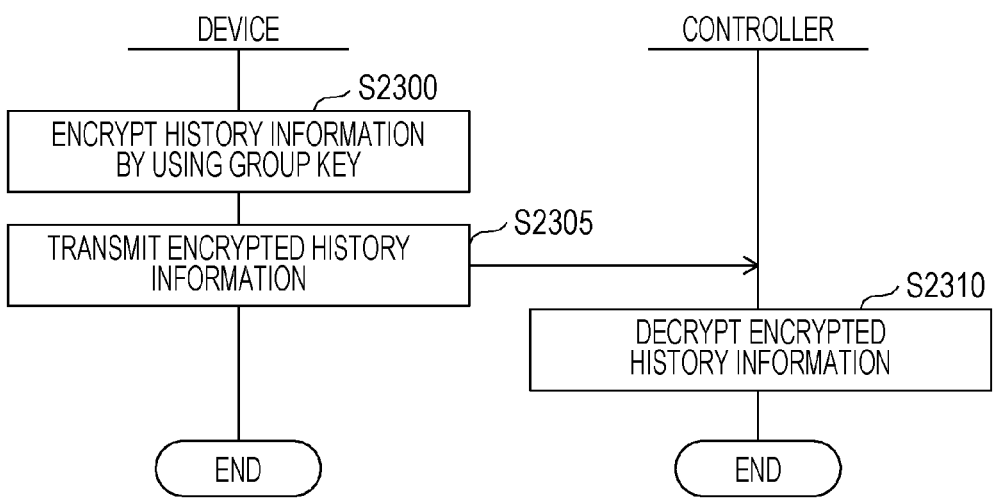
FIGS. 22A, 22B, 22C, and 22D are diagrams illustrating the connected controller management table and the group-relating information stored in the device A after group merger and the connected controller management table and the group-relating information stored in the device B after group merger, respectively.
FIG. 23 is a sequence diagram illustrating an example of a device history information transmission process.

The process of transmitting device history information from the paired device to the controller will be described next with reference to FIG. 23. This device history information transmission process is performed on a regular or irregular basis.

(S2300) The device encrypts the device history information stored on the device history information storage unit 850 by using the group key stored in the connected controller management table 900 to generate encrypted history information.

(S2305) The device transmits, to the controller registered as the controlling controller 911 of the group-relating information 910, the encrypted history information generated in step S2300.

(S2310) Upon receipt of the encrypted device history information from the paired device, the controller decrypts the encrypted device history information by using the group key stored in the record for the corresponding device in the connected device management table 500.

The above is the device history information transmission process. Note that the controller may transmit the decrypted device history information to an external server or the like.

<Control Command Transmission Process>

Figure 24:
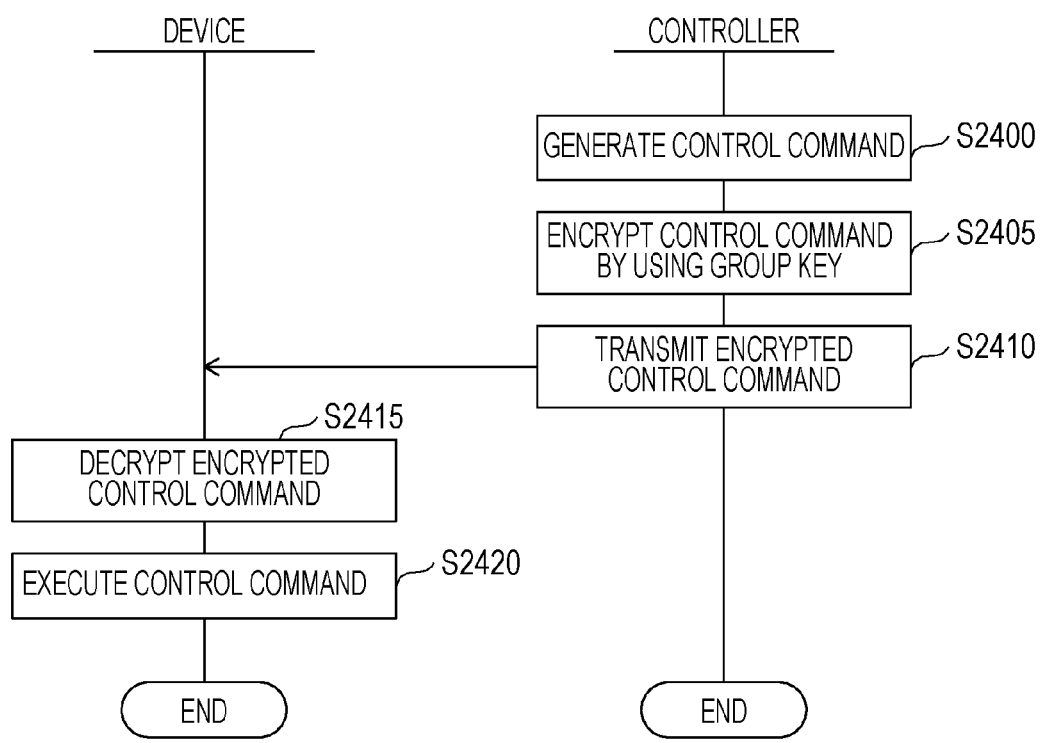
FIG. 24 is a sequence diagram illustrating an example of a control command transmission process.

The process of transmitting a control command from a controller to a paired device will be described next with reference to FIG. 24. This control command transmission process may be performed on a regular or irregular basis.

(S2400) The controller generates a control command for each device paired with the controller, on the basis of a control request from an external server or the like.

(S2405) The controller encrypts each generated control command by using the group key stored in the record for the corresponding device in the connected device management table 500 to generate an encrypted control command.

(S2410) The controller transmits the generated encrypted control command to the corresponding paired device. When the controller transmits the same control command that has been encrypted by using the same group key to a plurality of devices, the controller transmits the encrypted control command over simultaneous broadcasting (multicast communication).

(S2415) Upon receipt of the encrypted control command from the paired controller, the device decrypts the encrypted control command by using the group key stored in the connection controller management table 900.

(S2420) The device executes the decrypted control command.

The above is the control command transmission process.

<Regarding Updating of Connected Device Management Table and Group-Relating Information>

The authentication system 100 operates while performing group merger from the state of the group configuration illustrated in FIG. 2 to the state illustrated in FIG. 3 by appropriately performing the device registration process, the negotiation process, the SC handover process, the mutual authentication process, the shared key computation process, and the group key distribution/reception process described above.

It is now assumed that the controller A and the controller B perform the device registration process when the group configuration in the HAN is the state illustrated in FIG. 2 and the group configuration changes to the one illustrated in FIG. 3 as a result of group merger. How the connected device management table 500 and the group-relating information 510 of each of the controllers and the connected controller management table 900 and the group-relating information 910 of each of the devices are updated will be described with reference to FIGS. 19A to 22D.

FIGS. 19A, 19B, 19C, and 19D are diagrams illustrating the connected device management table 500 and the group-relating information 510 stored by the controller A before group merger and the connected device management table 500 and the group-relating information 510 stored by the controller B before group merger, respectively.

FIGS. 20A, 20B, 20C, and 20D are diagrams illustrating the connected controller management table 900 and the group-relating information 910 stored by the device A before group merger and the connected controller management table 900 and the group-relating information 910 stored by the device B before group merger, respectively.

FIGS. 21A, 21B, 21C, and 21D are diagrams illustrating the connected device management table 500 and the group-relating information 510 stored by the controller A after group merger and the connected device management table 500 and the group-relating information 510 stored by the controller B after group merger, respectively.

FIGS. 22A, 22B, 22C, and 22D are diagrams illustrating the connected controller management table 900 and the group-relating information 910 stored by the device A after group merger and the connected controller management table 900 and the group-relating information 910 stored by the device B after group merger, respectively.

FIGS. 19A and 19B respectively illustrate the connected device management table 500 and the group-relating information 510 of the controller A when the group configuration in the HAN is the state illustrated in FIG. 2. FIGS. 19C and 19D respectively illustrate the connected device management table 500 and the group-relating information 510 of the controller B when the group configuration in the HAN is the state illustrated in FIG. 2. FIGS. 20A and 20B respectively illustrate the connected controller management table 900 and the group-relating information 910 of the device A when the group configuration in the HAN is the state illustrated in FIG. 2. FIGS. 20C and 20D respectively illustrate the connected controller management table 900 and the group-relating information 910 of the device B when the group configuration in the HAN is the state illustrated in FIG. 2.

FIGS. 21A and 21B respectively illustrate the connected device management table 500 and the group-relating information 510 of the controller A after the SC handover process. FIGS. 21C and 21D respectively illustrate the connected device management table 500 and the group-relating information 510 of the controller B after the SC handover process. FIGS. 22A and 22B respectively illustrate the connected controller management table 900 and the group-relating information 910 of the device A after the SC handover process. FIGS. 22C and 22D respectively illustrate the connected controller management table 900 and the group-relating information 910 of the device B after the SC handover process.

When FIG. 19A and FIG. 21A are compared with each other, a record for the controller B (record with the device ID "004") that has been newly put under the control of the controller A and a record for the device B (record with the device ID "002") that has been newly put under the control of the controller A have been added to the connected device management table 500 of the controller A. The record for the controller B is a recorded that has been added when the controller A and the controller B have performed mutual authentication during the negotiation process between the controller A and the controller B (see step S1205 of FIG. 12 and steps S1410 and S1425 of FIG. 14). The record for the device B is a record that has been added when the information concerning the device notified by the outgoing SC is registered during the SC handover process from the controller B (outgoing SC) to the controller A (incoming SC) (see steps S1320 and S1330 of FIG. 13).

When FIG. 19B and FIG. 21B are compared with each other, the device IDs of the controller B and the device B that have been newly put under the control of the controller A have been added as the device under the control 513 of the group-relating information 510 of the controller A. This addition has been performed when the device which the controller A has been notified by the outgoing SC and the outgoing SC have been registered as the devices under the control of the controller A during the SC handover process from the controller B (outgoing SC) to the controller A (incoming SC) (see step S1320 of FIG. 13).

When FIG. 19C and FIG. 21C are compared with each other, a record for the controller A that has been newly selected as the SC (record with the device ID "003") has been added to the connected device management table 500 of the controller B. The record for the controller A is a record that has been added when the controller A and the controller B have performed mutual authentication during the negotiation process between the controller A and the controller B (see step S1205 of FIG. 12 and steps S1410 and S1425 of FIG. 14). The values for the group key validity period 505 and the group key update flag 506 in the connected device management table 500 for the controller B are set to "-", which indicates that the controller B is no longer the SC and does not need to manage these pieces of information.

When FIG. 19D and FIG. 21D are compared with each other, the SC 512 of the group-relating information 510 of the controller B has been changed from the device ID of the controller B to the device ID of the controller A. This change has been made when the incoming SC has been registered during the SC handover process from the controller B (outgoing SC) to the controller A (incoming SC) (see step S1325 of FIG. 13). The value for the device under the control 513 of the group-relating information 510 of the controller B is set to "-" in FIG. 21D, which indicates that the controller B is no longer the SC and does not need to manage the information.

When FIGS. 20A and 20B and FIGS. 22A and 22B are respectively compared with each other, there is no change in the connected controller management table 900 and the group-relating information 910 of the device A. This indicates that the SC of the device A has not been changed by this group merger.

When FIGS. 20C and 20D and FIGS. 22C and 22D are respectively compared with each other, a record with the device ID of the controller A that has been newly selected as the SC has been added to the connected controller management table 900 of the device B and the SC 912 of the group-relating information 910 has been changed from the device ID of the controller B, which is the outgoing SC, to the device ID of the controller A, which is the incoming SC. This change has been made when the controller A has been registered as the incoming SC after the device B that has been under the control of the outgoing SC has received the SC switching notification from the outgoing SC during the SC handover process from the controller B (outgoing SC) to the controller A (incoming SC) (see steps S1315 and S1330 of FIG. 13).

As illustrated in FIGS. 19A to 22D above, the connected device management table 500 and the group-relating information 510 of each controller and the connected controller management table 900 and the group-relating information 910 of each device are updated.

<Flow of Participation of New Controller>

Now, a description will be given of a flow performed when a group is constructed as a result of performing the device registration process, the negotiation process, the SC handover process, the mutual authentication process, the shared key computation process, the group key distribution/reception process, and the group key updating process from a state where none of devices and controllers in the HAN are paired and then a new controller participates in the group.

First, it is assumed that there are a controller A and a device A that are not paired with any of devices and controllers in the HAN. In this state, the controller A is set as the SC of the controller A, and no SC is set in the device A.

Figure 10:
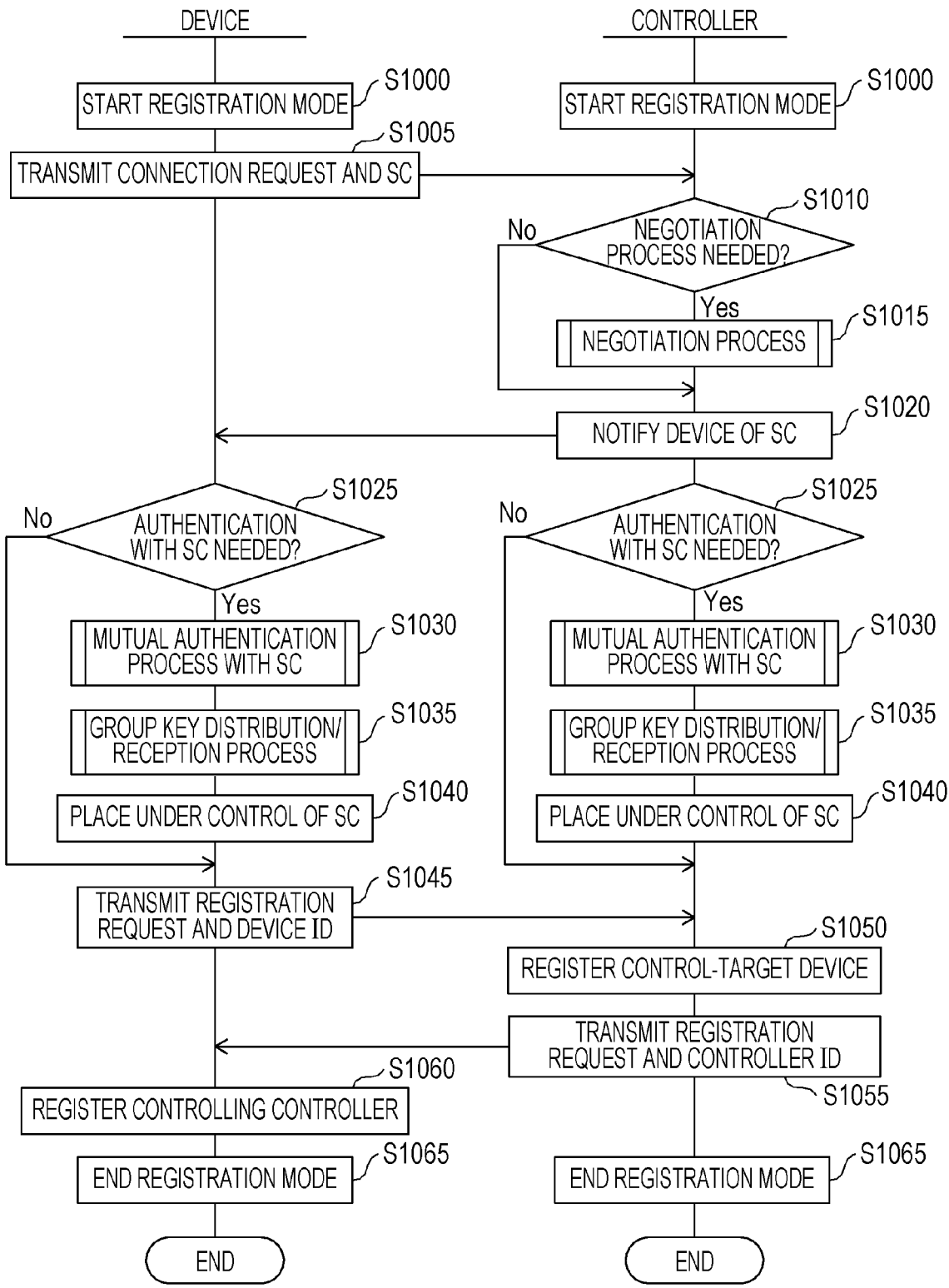
FIG. 10 is a sequence diagram illustrating an example of an operation performed by the authentication system during device registration.

In response to a user operation for pairing the controller A and the device A, the above-described device registration process illustrated in FIG. 10 is performed between the controller A and the device B.

Since no SC is set in the device A, the negotiation process is skipped and the device A is notified of, as the incoming SC, the controller A that is set as the SC of the controller A during this registration process (see steps S1010 and S1020).

Since newly registering the SC necessitates the device A performing authentication with the SC, the device A performs the mutual authentication process with the controller A serving as the SC (see steps S1025 and S1030). This mutual authentication process between the device A and the controller A is referred to as first mutual authentication.

After the first mutual authentication, the device A and the controller A perform the group key distribution/reception process, and consequently a group key is shared between the device A and the controller A (see step S1035). The group key shared at that time is referred to as a first group key.

Then, the device A is put under the control of the controller A, and a group including the device A and the controller A is formed (see step S1040). Thereafter, every time the validity period of the first group key becomes less than or equal to a predetermined value, the controller A performs the group key updating process illustrated in FIGS. 17 and 18 and updates the first group key that is the group key shared in the group.

It is assumed that a controller B not paired with any device is newly connected to the HAN in this state. At that time, the controller B is set as the SC of the controller B.

In response to a user operation for pairing the controller A and the controller B, the device registration process illustrated in FIG. 11 is performed between the controller A and the controller B.

Since the SC set in the controller A and the SC set in the controller B are different from each other, the negotiation process takes place between the SC of the controller A and the SC of the controller B during this device registration process (see steps S1110 and S1115). In this case, the controller A and the controller B perform the negotiation process.

Figure 12:
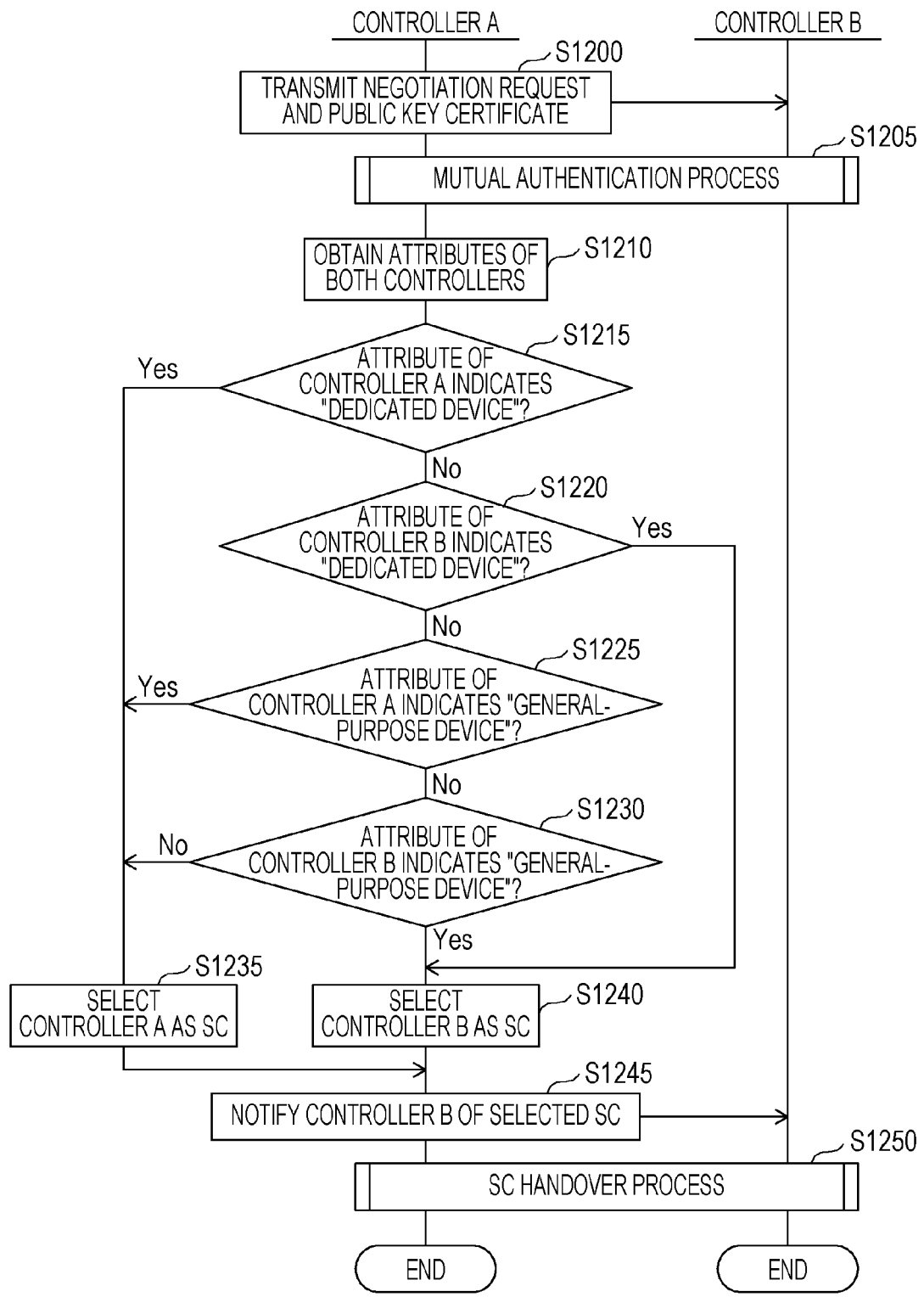
FIG. 12 is a sequence diagram illustrating an example of a negotiation process.

During the negotiation process, the mutual authentication process is performed between the controller A and the controller B (see step S1205 of FIG. 12). This mutual authentication process performed between the controller A and the controller B is referred to as second mutual authentication.

After the second mutual authentication, which of the controller A and the controller B becomes the SC is determined.

If the controller B is selected as the SC, the SC handover process from the controller A to the controller B is performed. During the SC handover process, the group key distribution/reception process is performed in which the first group key generated by the controller A which is the outgoing SC is shared between the controller A which is the outgoing SC and the controller B which is the incoming SC (see step S1300 of FIG. 13).

At that time, the controller A, the controller B, and the device A share the first group key which is the group key generated by the controller A. Thus, the controller A, the controller B, and the device A are able to perform encrypted communication by using the first group key until the group key updating process is performed by the incoming SC.

Figure 17:
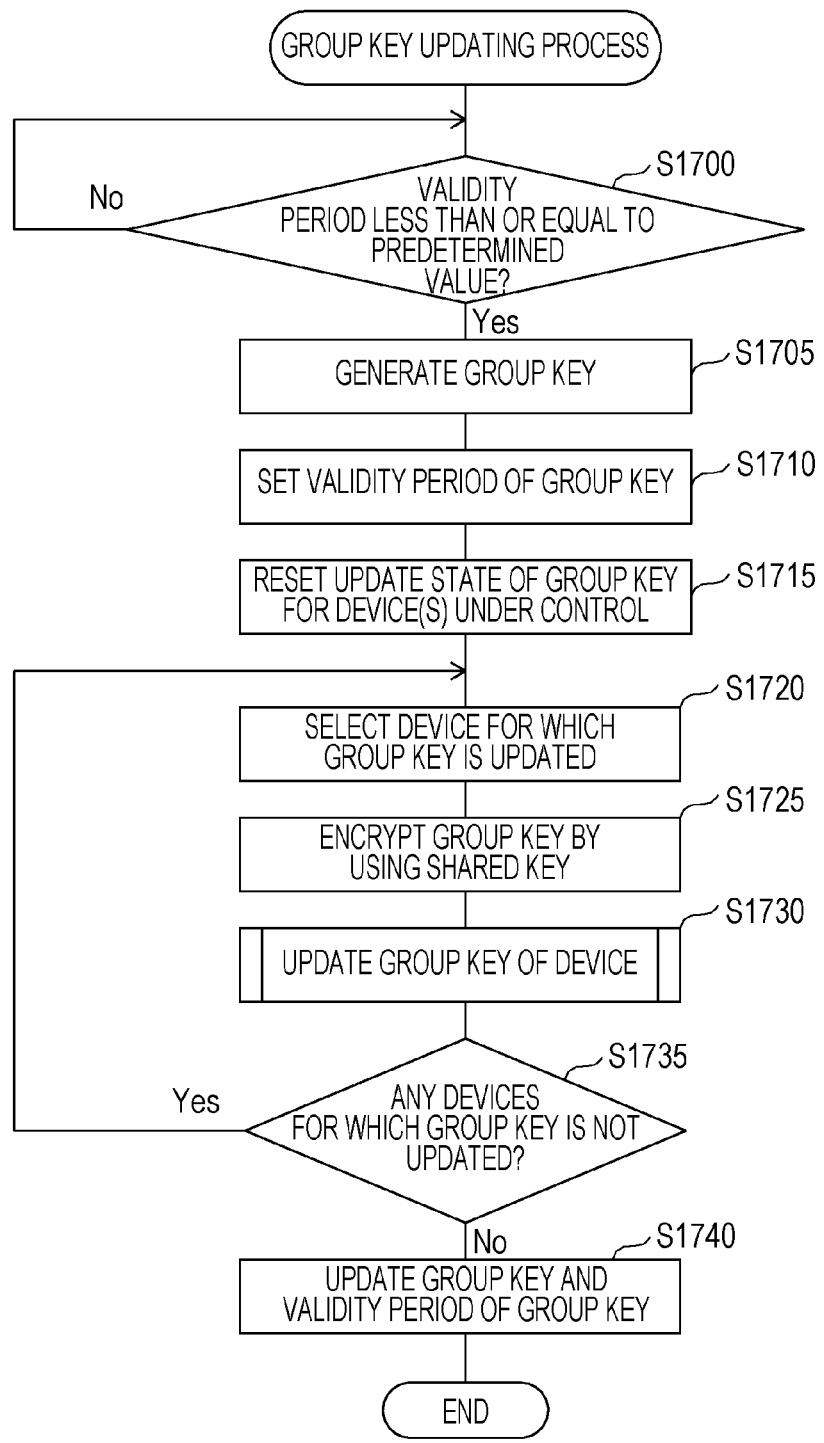
FIG. 17 is a sequence diagram illustrating an example of a group key updating process.
Figure 18:
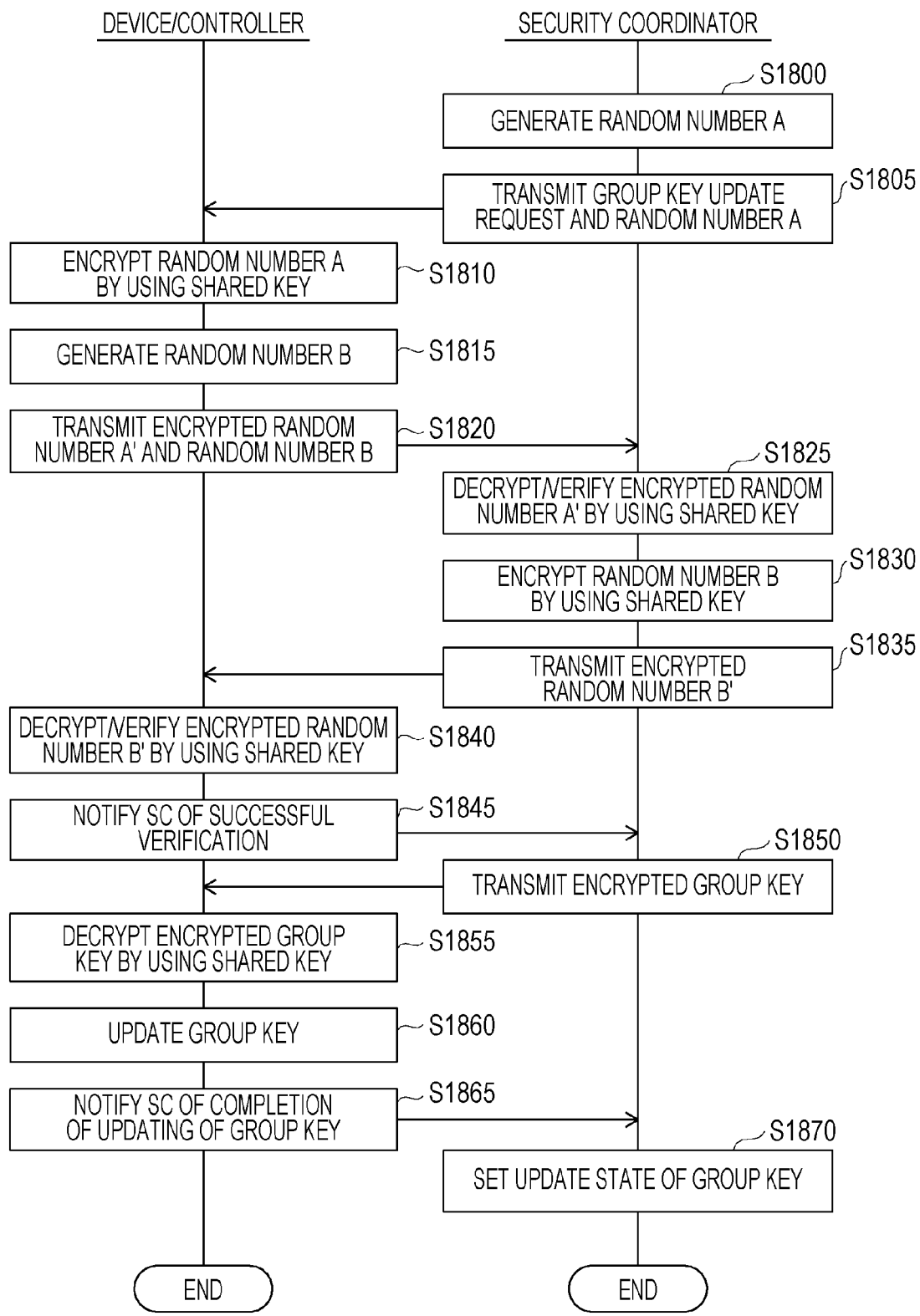
FIG. 18 is a sequence diagram illustrating an example of a group key updating process.

Upon the validity period of the first group key becoming less than or equal to the predetermined value, the group key updating process illustrated in FIGS. 17 and 18 is performed. During the group key updating process, the controller B serving as the SC generates a group key. This group key is referred to as a second group key (see step S1705 of FIG. 17). Then, the controller B performs, by using the shared key and random numbers, mutual authentication with each of the controller A and the device A which are devices under the control thereof (see steps S1800 to S1845 of FIG. 18). This mutual authentication using the shared key and random numbers is referred to as third mutual authentication.

The controller B shares the second group key with the controller A and the device A for which the third mutual authentication has been successful.

As described above, when the SC is handed over to a controller that has newly participated in the group and the group key is updated by the incoming SC, the first mutual authentication, the second mutual authentication, and the third mutual authentication are performed.

Advantageous Effects of First Embodiment

In the first embodiment, controller(s) and device(s) form a group. If one group includes a plurality of controllers, the negotiation process is performed between the plurality of controllers. Each of the controllers performs negotiation by using the attribute thereof contained in their public key certificates, whereby a controller for which a power-off or network-disconnection state is less likely is preferentially selected as the SC. With this configuration, when a new device or controller participates in the group or when it becomes necessary to update the group key, the group key can be quickly shared in the group.

In addition, in the first embodiment, when the SC is switched between the controllers, the SC handover process from the outgoing SC to the incoming SC is performed and the result of authentication which the outgoing SC has performed with the devices under the control thereof is handed over to the incoming SC. With this configuration, authentication using public key certificates performed between the incoming SC and each device under the control of the outgoing SC can be omitted. Consequently, the processing load of the devices and the controllers is successfully reduced.

Further, in the first embodiment, when the SC is switched between the controllers, the outgoing SC transmits the group key generated by the outgoing SC to the incoming SC. With this configuration, the incoming SC can perform encrypted simultaneous broadcasting to the devices under the control of the outgoing SC by using the group key generated by the outgoing SC even before the group key generated by the incoming SC is distributed.

Modifications

While the authentication system using the authentication method according to the present disclosure has been described on the basis of the embodiment above, the authentication system can be modified as follows. The present disclosure is not limited to the authentication system described in the above embodiment.

<1> The SC handover process described in the first embodiment may be modified in the following manner.

Figure 25:
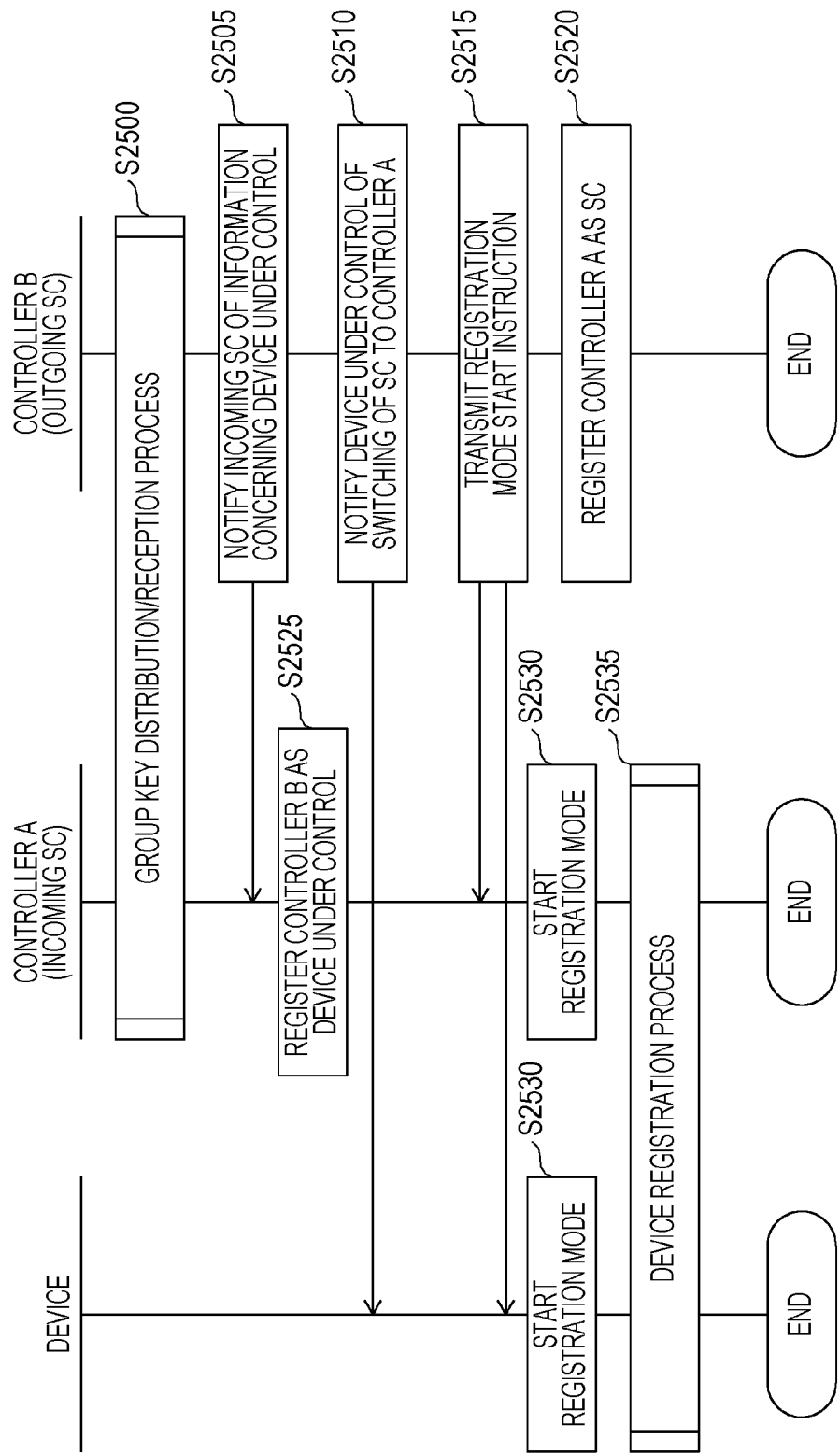
FIG. 25 is a sequence diagram illustrating an example of an SC handover process.

FIG. 25 is a diagram illustrating a modification of the SC handover process.

Since processing of steps S2500, S2505, S2510, S2520, and S2525 is substantially the same as the processing of steps S1300, S1305, S1310, S1320, and S1325 of the SC handover process according to the first embodiment, a description thereof is omitted.

(S2515) The controller B which is the outgoing SC transmits a registration mode start instruction to the devices under the control thereof and the controller A which is the incoming SC.

(S2530) Upon receipt of the registration mode start instruction from the controller B, the controller A and the devices under the control of the outgoing SC start the registration mode.

(S2535) The controller A sequentially performs the device registration process with each of the devices under the control of the outgoing SC. Since the device registration process is a process that is substantially the same as steps S1005 to S1065 of FIG. 10, a description thereof is omitted here.

During the SC handover process illustrated in FIG. 25, when the SC is switched, the outgoing SC transmits the registration mode start instruction to the devices under the control of the outgoing SC and to the incoming SC, and the incoming SC and the devices under the control of the outgoing SC start the registration mode. With this configuration, the incoming SC and the devices under the control of the outgoing SC can perform the device registration process even if the user does not manually start the registration mode. Thus, convenience improves for the user.

<2> During the SC handover process according to the first embodiment, the outgoing SC transmits the public key certificates of the devices under the control thereof to the incoming SC when the outgoing SC notifies the incoming SC of information concerning the devices under the control thereof. However, the present disclosure is not limited to this one, and each of the devices under the control of the outgoing SC that has received the SC switching notification from the outgoing SC may transmit the public key certificate stored therein to the incoming SC, instead of the outgoing SC transmitting the public key certificates of the devices under the control thereof to the incoming SC. In this case, each of the devices under the control of the outgoing SC may encrypt the public key certificate by using the group key generated by the outgoing SC before transmitting the public key certificate to the incoming SC.

<3> The negotiation process according to the first embodiment has been described in which the controller serving as the SC is selected in accordance with a category ("dedicated device", "general-purpose device", or "app") based on the function of the controller that is contained in the public key certificate as the attribute of the device. However, the negotiation process according to the present disclosure is not limited to this one. For example, version information of the communication scheme, the authentication method, or the like may be contained in the public key certificate as the attribute of the device, and the controller having the public key certificate containing the latest version number as the version information of the communication scheme, the authentication method, or the like may be selected as the SC from among the controllers that perform the negotiation process. In addition, a controller having the version information indicating a large number of compatible devices or compatible functions may be selected as the SC. With such a configuration, a controller having the latest function or a controller having many compatible devices or compatible functions can be selected as the SC.

In addition, the maximum number of devices with which the controller can be paired may be contained in the public key certificate as the attribute of the device, and a controller having the largest maximum number may be selected as the SC from among the controllers that perform the negotiation process. With this configuration, the controller capable of being paired with more devices can be selected as the SC.

Communication function types (wired, dedicated wireless, general-purpose wireless, and near field communication) supported by the controller may be contained in the public key certificate as the attribute of the device, and a controller serving as the SC may be selected in accordance with the communication function types. At that time, the priority may be set such that the controller is selected as the SC in the order of "wired", "dedicated wireless", "general-purpose wireless", and "near field communication". This order is an order with which the controller that supports communication more likely to be connected to the HAN (less likely to be disconnected from the HAN) is more likely to be selected as the SC. With this configuration, the controller that is more likely to be connected to the HAN when the SC is needed can be selected as the SC.

The power supply mode (continuously powered, regularly powered, or shortly powered) may be contained in the public key certificate as the attribute of the device, and a controller serving as the SC may be selected in accordance with the mode. At that time, the priority may be set such that the controller is selected as the SC in the order of "continuously powered", "regularly powered", and "shortly powered". This order is an order with which the controller that is more likely to be operating (less likely to be powered off) is more likely to be selected as the SC. With this configuration, the controller that is more likely to be operating when the SC is needed can be selected as the SC. Here, the "continuously powered" devices are devices that need to be powered all the time, such as a dedicated controller and a log collecting device for device control, a distribution switch board, a breaker, a refrigerator, an air-conditioner, a solar photovoltaic power generator, a storage cell (battery), a phone, a broadband router, and a terminating equipment. The "regularly powered" devices are devices, such as a television, a recorder, an audio device, and a ceiling light. The "shortly powered" devices are devices, such as a microwave oven, an oven, a washing machine, a vacuum cleaner, and a rice cooker.

The usage state (stationary (fixed), stationary (movable), carried, or worn) may be contained in the public key certificate as the attribute of the device, and a controller serving as the SC may be selected in accordance with the state. At that time, for example, the priority may be set such that the controller is selected as the SC in the order of "stationary (fixed)", "stationary (movable)", "carried", and "worn", for example. This order is an order with which the controller that is more easily moved is less likely to be selected as the SC. It is considered that a not-movable device has a communication environment that barely changes and the possibility of disconnection in the middle of communication is low. In addition, it is easier to get hold of a power supply for a not-movable device. Accordingly, a controller for which disconnection in the middle of communication is less likely and a power supply is more easily gotten hold of can be selected as the SC.

Further, the SC may be selected in accordance with the state of the device at that time, instead of selecting the SC in accordance with the attribute of the device contained in the public key certificate. For example, a controller having the largest number of devices paired therewith when the negotiation process is performed may be selected as the SC. With this configuration, the number of devices that need to be re-authenticated due to switching of the SC can be reduced. In addition, a controller having the shortest hours of operation may be selected as the SC or a controller having the latest date of manufacture may be selected as the SC. With this configuration, a possibility of the authentication process becoming unavailable due to a fault of the SC can be reduced.

In addition, the security coordinator may be selected by using the above criteria in combination.

<4> The negotiation process according to the first embodiment has been described to be automatically performed by the controller; however, the negotiation process according to the present disclosure may be configured such that the controller provides the user with SC candidate controllers and the user selects a controller serving as the SC from among the provided candidates. At that time, all controllers that can be the SC may be provided, or when a plurality of controllers are selected based on the criteria described in the first embodiment and the modification <3>, these candidates may be provided.

Figure 26:
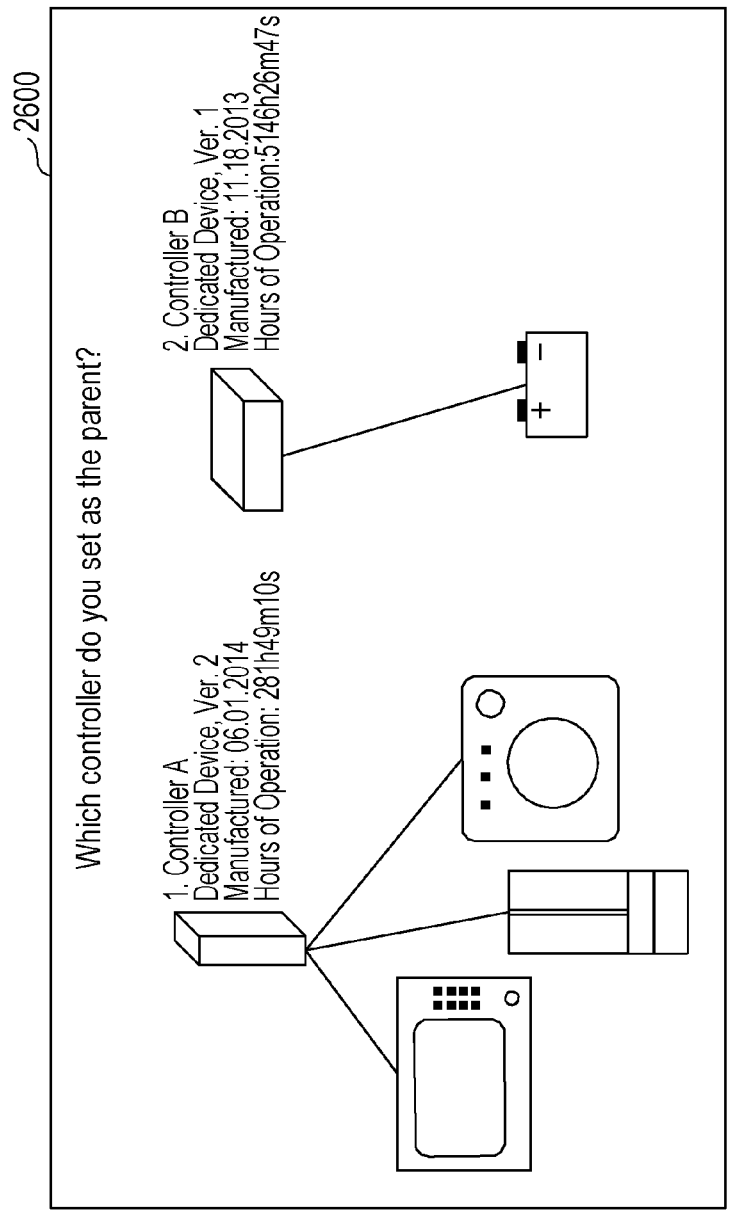
FIG. 26 is a diagram illustrating an example of an SC selection screen.

FIG. 26 is an example 2600 displayed on the display unit of the controller according to this modification. FIG. 26 illustrates a state where there are two SC candidate controllers and different home appliances are registered to each of them. In addition, the attributes of the device (the category based on the function of the controller; version information of the communication scheme, the authentication method, or the like; the date of manufacture; and the hours of operation) contained in the public key certificate of each of the two controllers are also displayed. The user selects a controller that serves as the SC in accordance with the provided information. The decision of the user is input by using a method, such as touching an icon of the selected controller in the screen, inputting the number (1 or 2) assigned to each of the controllers by using the input device, or inputting the identification sign (A or B) of the controller by using the input device. The input device may be any device capable of informing the controller of the decision of the user. The input device may be a physical key input device, an icon displayed on a touchscreen, a device to which an instruction is given by sound, a device to which an instruction is given by gesture, or a device to which an instruction is given by the line of sight.

<5> In the first embodiment, challenge-response authentication in which a random number is encrypted and the shared key is verified is performed in steps S1510 to S1555; however, the authentication method is not limited to this one. Authentication may be performed by using an authentication method described in RFC 5191. Since RFC 5191 is described in IETF: RFC5191: Protocol for Carrying Authentication for Network Access (PANA), Internet Engineering Task Force (IETF), May 2008, it is not described herein. In such a case, EAP-PSK in RFC 5191 may be used. In addition, the group key may be derived by using EMSK which is derived as a result of EAP-PSK-based negotiation. Further, HMAC_SHA2_256 may be used as the key derivation function.

<6> In the first embodiment, challenge-response authentication in which a random number is encrypted and the shared key is verified is performed in steps S1510 to S1555; however, the authentication method is not limited to this one. Authentication may be performed by using an authentication method described in RFC 6347. Since RFC 6347 is described in IETF: RFC6347: Datagram Transport Layer Security Version 1.2, Internet Engineering Task Force (IETF), January 2012, it is not described herein.

<7> In the above embodiment, the device registration process is performed when a controller newly participates in a group in response to the newly participating controller and an existing controller in the group starting the registration mode; however, the present disclosure is not limited to this procedure. For example, the procedure may be as follows. When a controller newly participates in a group, the newly participating controller and a device in the group start the registration mode. At that time, the device refers to the connected controller management table and transmits information concerning the controller set as the SC of the device to the newly participating controller. The newly participating controller receives the information concerning the SC and performs authentication with the SC. In this way, the newly participating controller is allowed to participate in the group. With this configuration, even if the SC of the group is at a remote place in a home, the SC and the newly participating controller can perform authentication as a result of a device under the control of the SC starting the registration mode.

<8> The controller may display the power consumption of each device connected thereto, an amount of power in the storage battery, and an amount of power generated by solar photovoltaic power generation.

<9> The controller may be a distribution switch board installed in a home.

<10> In the first embodiment, the controller serving as the SC manages the validity period of the group key and transmits the group key update notification to each device during the group key updating process; however, the controller serving as the SC may notify each device of the validity period of the group key, and each device may manage the validity period of the group key and may transmit a group key update notification to the controller serving as the SC.

<11> In the first embodiment, the validity period of the group key is managed as the remaining time; however, the parameter is not limited to this one. The validity period of the group key may be managed as the generation time of the group key or the revocation time of the validity period of the group key. When the validity period of the group key is managed as the generation time of the group key, a duration of the validity period of the group key is separately stored and it is determined whether to update the group key by comparing the current time with the time obtained by adding the validity period of the group key to the generation time of the group key. In addition, when the validity period of the group key is managed as the revocation time of the validity period of the group key, it is determined whether to update the group key by comparing the current time with the revocation time of the validity period of the group key.

<12> In the first embodiment, if there is a device for which the group key has not been updated yet during the group key updating process, a group key update notification is transmitted and the group key is updated. The group key update notification may be regularly transmitted when the device is powered off.

<13> In the first embodiment, if there is a device for which the group key has not been updated yet during the group key updating process, a group key update notification is transmitted and the group key is updated. If the device is controlled by its paired controller, the device may notify the controller of an extended period for the group key and the group key updating process may be performed after the extended period has passed.

<14> In the first embodiment, the incoming SC and the devices under the control of the outgoing SC compute the shared key (S1330) after the SC switching notification during the SC handover process; however, the shared key may be computed at any time before the group key updating process is performed due to expiration of the validity period of the group key. For example, the shared key may be computed when no operation is performed in the device or immediately before the group key updating process. With this configuration, the shared key can be computed between the controller and the device without imposing a load on the operation of the device.

<15> In the first embodiment, the controller A selects the SC (step S1210 to S1240) during the negotiation process;

however, the configuration is not limited to this one, and each of the controller A and the controller B may select the SC.

<16> Suppose that when a device or a controller transmits a message, such as when a paired device transmits device history information to its corresponding controller or when the controller transmits a control command to the device, simultaneous broadcast transmission (multicast communication) is performed to all the devices and controllers in the HAN. At that time, if the device history information or the control command alone is encrypted before transmission, spoofing of the device or controller that performs multicast transmission may be possible. That is, the header, the source address, or the destination address of a message is possibly falsified by an unauthorized device. Accordingly, authentication data, such as MAC (Message Authentication Code), is generated by using the header, the source address, and the destination address of the message in addition to the device history information or the control command, and the message including the generated authentication data is transmitted. In this way, spoofing by a third party not having the group key can be prevented. For example, even if a third party falsifies the source address or destination address to an address of another controller or device, the falsification can be detected by verifying the authentication data.

Figure 27A:
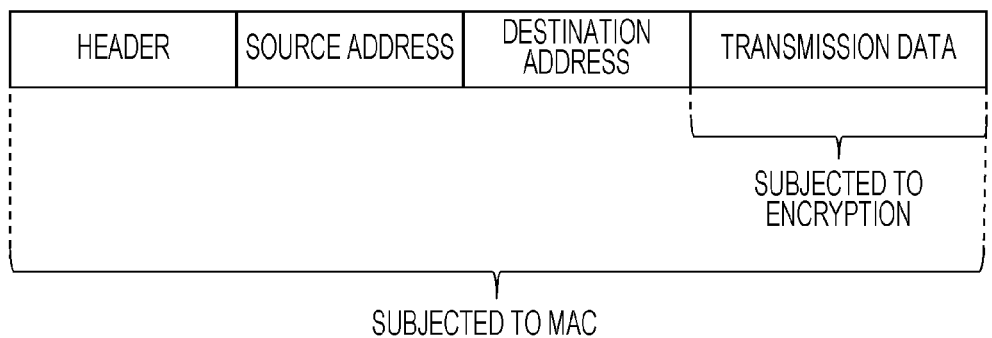
FIGS. 27A and 27B are diagrams illustrating a message format before encryption and a message format after encryption, respectively.

FIG. 27A illustrates a message format before encryption. The message includes a header, a source address, a destination address, and transmission data. The header includes a fragment flag and the fragment number that are assigned when the transmission data, such as the control command or the device history information, is divided into a plurality of packets. In addition, the header may include information indicating that the transmission data, such as the device history information or the control command, is encrypted by using the group key. The source address is an address of a device or controller that transmits the message and includes information that enables identification of the device or controller, for example, an IP (Internet Protocol) address or a MAC (Media Access Control) address. The destination address is an address of a device or controller that receives the message and includes information that enables identification of the device or controller, such as an IP address or a MAC address. In the case of simultaneous broadcasting (multicast transmission), the destination address includes a multicast address. The transmission data includes transmission data, such as the device history information, the control command, or the SC switching notification.

As illustrated in the figure, the transmission data is subjected to encryption, and the header, the source address, the destination address, and the transmission data form the authentication data (MAC). Specifically, a device or controller encrypts the transmission data, i.e., plaintext, by using the group key as the key. In addition, the device or controller generates the authentication data by using, as the key, the group key and using, as the plaintext, the header, the source address, the destination address, and the transmission data not encrypted. At that time, encryption may be performed by using AES, and the authentication data may be generated by using AES-CBC-MAC (Cipher Block Chaining MAC), AES-CMAC (Cipher-based MAC), or HMAC (Hash-based MAC). In addition, encryption and generation of the authentication data may be performed based on authenticated encryption such as AES-CCM (Counter with CBC MAC) or AES-GCM (Galois/Counter Mode). Even when authenticated encryption is used, the control command may be used as plaintext during encryption and the header, the source address, the destination address, and the transmission data not encrypted may be used as plaintext during generation of the authentication data.

Figure 27B:

FIG. 27B illustrates a message format after encryption. Authenticated encryption data in the encrypted message is data in which the encrypted transmission data and the authentication data are combined together.

Figure 28:
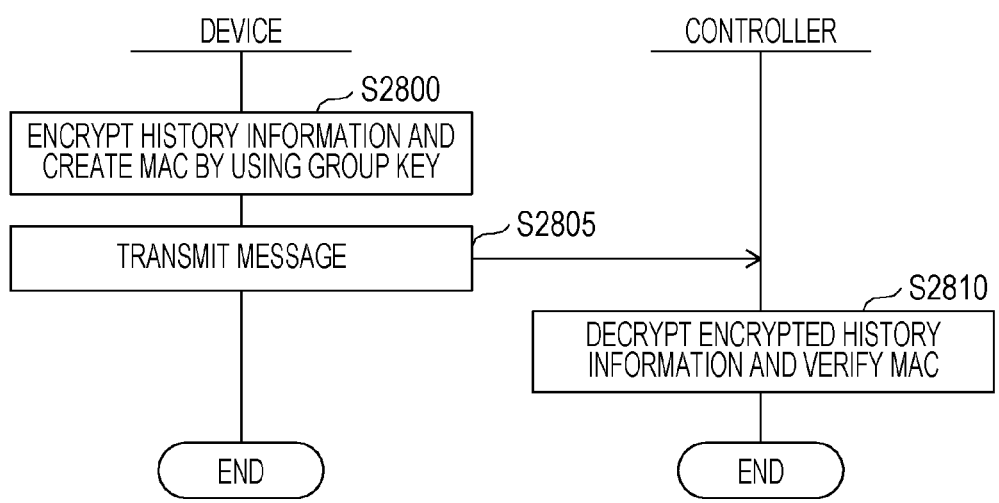
FIG. 28 is a sequence diagram illustrating an example of a device history information transmission process.

A process of simultaneously broadcasting device history information from a device to controllers will be described with reference to FIG. 28.

(S2800) The device generates a message to be transmitted to each controller paired therewith. Specifically, the device first sets the header, the source address, and the destination address of the message. Then, the device performs encryption by using, as the key, the group key stored in the connected controller management table 900 and using, as plaintext, device history information stored on the device history storage unit 850 and generates authentication data by using, as the key, the group key and using, as plaintext, the set header, source address, and destination address, and the device history information not encrypted. The device then concatenates the encrypted device history information and the generated authentication data together to generate authenticated encryption data.

(S2805) The device simultaneously broadcasts the generated message to the controllers paired therewith.

(S2810) Upon receipt of the message from the device paired therewith, each controller decrypts the encrypted device history information and verifies the authentication data by using the group key stored in the record for the corresponding device in the connected device management table 500. If the verification of the authentication data is successful, the controller transmits the decrypted device history information to an external server, for example.

Figure 29:
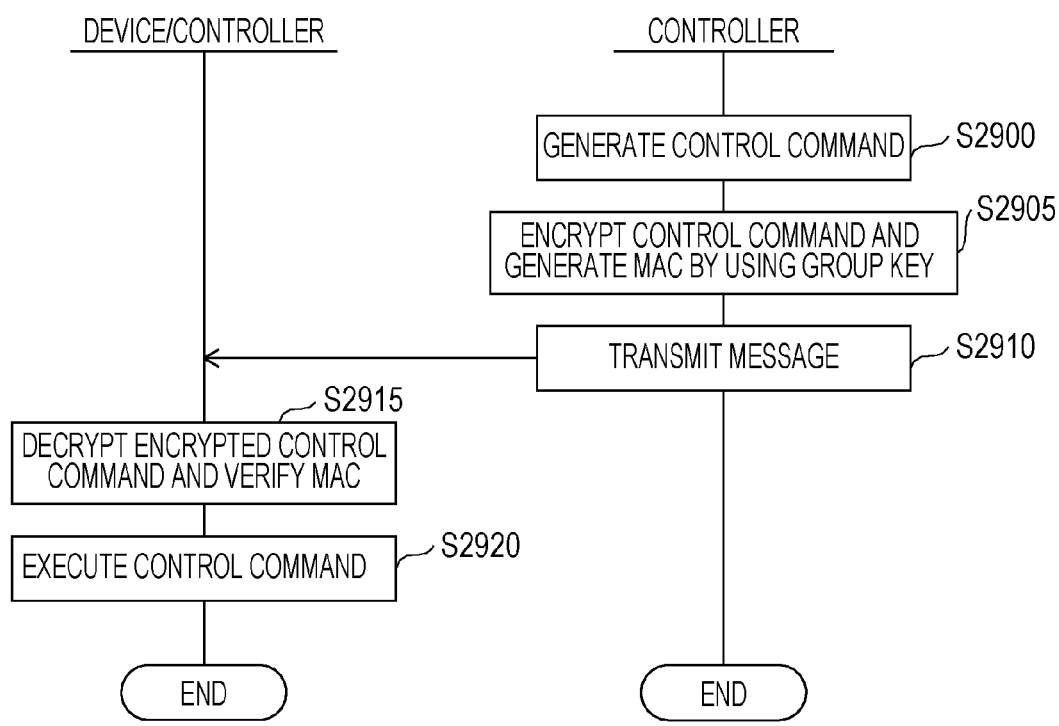
FIG. 29 is a sequence diagram illustrating an example of a control command transmission process.

A process of simultaneously broadcasting a control command from a controller to devices will be described next with reference to FIG. 29.

(S2900) The controller generates a control command for devices paired therewith on the basis of a control request or the like from an external server.

(S2905) The controller generates a message to be transmitted to the devices paired therewith. Specifically, the controller first sets the header, the source address, and the destination address of the message. Then, the controller performs encryption by using, as the key, the group key stored in the record for the corresponding device in the connected device management table 500 and using, as plaintext, the generated control command and generates authentication data by using, as the key, the group key and using, as plaintext, the set header, the source address, and the destination address, and the control command not encrypted. Then, the controller concatenates the encrypted control command and the generated authentication data together to generate authenticated encryption data.

(S2910) The controller simultaneously broadcasts the generated message to the devices paired therewith.

(S2915) Upon receipt of the message from the controller paired therewith, each device decrypts the encrypted control command and verifies the authentication data by using the group key stored in the connected controller management table 900.

(S2920) If the verification of the authentication data is successful, the device executes the decrypted control command.

When the device history information or the control command is transmitted, the transmission data is encrypted and the authentication data is generated. In addition to these, the SC switching notification may also be encrypted and authentication data may be generated therefor in S1310 of the SC handover process described in the first embodiment. Alternatively, authentication data alone may be generated for the SC switching notification without encryption. At that time, the authentication data is generated by using, as the key, the group key and using, as plaintext, the header, the source address, and the destination address of the message and notification information. The notification information includes information indicating that the SC has been switched and indicating the incoming SC. The message including the notification information and the authentication data is then transmitted. With this configuration, the outgoing SC transmits the SC switching notification after attaching the authentication data thereto, and the device or controller that has received it verifies the authentication data, whereby it can be guaranteed that the SC switching notification has not been falsified and switching of the SC can be performed reliably.

Whether to perform encryption and whether to generate authentication data may be determined depending on the types of message, such as the device history information, the control command, and the notification. With this configuration, processing performed by the device or controller that has received the message can be lightened.

If a control command from a controller to devices includes a plurality of control commands, the plurality of control commands may be transmitted as a plurality of messages. At that time, the plurality of messages may be transmitted with the fragment flag and the fragment number included in the header. In addition, the device that has received the messages may execute the control command after receiving the plurality of messages since the control command is constituted by the plurality of messages if the fragment flag is set in the header. At that time, in the case where authentication data has been generated for all the messages, if verification of the authentication data fails for any of the plurality messages, the device need not execute the control command. In addition, if verification of the authentication data fails for any one of the plurality of messages, a plurality of following messages with the fragment flag may be discarded without performing verification of the authentication data. With this configuration, processing performed by the device that has received the messages can be lightened.

If authentication data is not generated for every message, authentication data may be generated by using, as plaintext, a concatenation of the headers, the source addresses, the destination addresses of all the messages, and the control commands, and the authentication data may be added to the last message. With this configuration, the integrity of all the messages can be verified by performing verification on the authentication data only once, and the processing performed by the device that has received the messages can be lightened.

<17> Specifically, the each of the above-described devices is a computer system including a microprocessor, a ROM, a RAM, a hard disk unit, a display unit, a keyboard, a mouse, and so forth. The RAM or the hard disk unit stores a computer program. The microprocessor operates in accordance with the computer program, and consequently each device achieves its functions. The computer program is a combination of a plurality of instruction codes representing instructions for the computer for achieving certain functions.

<18> Some or all of the components of each of the devices described above may be constituted by one system LSI (Large Scale Integration). A system LSI is a super multifunctional LSI produced by integrating a plurality of components on one chip. Specifically, a system LSI is a computer system including a microprocessor, a ROM, a RAM, and so forth. The RAM stores a computer program. The microprocessor operates in accordance with the computer program, and consequently a system LSI achieves its functions.

In addition, the individual components of each of the devices described above may be configured as separate chips or as one chip including some or all of them.

In addition, the term "system LSI" is used herein; however, other terms including IC, LSI, super LSI, and ultra LSI may be used depending on the degree of integration. In addition, the circuit integration technique is not limited to LSI, and circuit integration may be implemented as a dedicated circuit or a general-purpose processor. An FPGA (Field Programmable Gate Array) that is programmable after production of the LSI or a reconfigurable processor in which connections and settings of circuit cells within the LSI are reconfigurable may be used.

Further, if a circuit integration technology that may substitute for LSI appears due to an advance in the semiconductor technology or another related technology, the functional blocks may be integrated using such a technology obviously. Adaptation of the biotechnology may be possible.

<19> Some or all of the components of each of the devices described above may be implemented by an IC card or a discrete module detachably attached to the device. The IC card or the module is a computer system including a microprocessor, a ROM, a RAM, and so forth. The IC card or the module may include the super multifunctional LSI mentioned above. The microprocessor operates in accordance with a computer program, and consequently the IC card or the module achieves its functions. This IC card or module may be tamper-resistant.

<20> The present disclosure may be considered as the methods described above. In addition, the present disclosure may be considered as a computer program that implements these methods by using a computer or digital signals representing the computer program.

In addition, the present disclosure may be considered as a computer-readable recording medium, for example, a flexible disk, a hard disk, a CD-ROM, an MO, a DVD, a DVD-ROM, a DVD-RAM, a BD (Blu-ray Disc), a semiconductor memory, or the like storing the computer program or the digital signals. In addition, the present disclosure may be considered as the digital signals stored on these recording media.

In addition, the present disclosure may be considered as a configuration in which the computer program or the digital signals are transmitted via an electrical communication line, a wireless or wired communication line, a network typically the Internet, or data broadcast, for example.

In addition, the present disclosure may be considered as a computer system including a microprocessor and a memory. The memory may store the computer program, and the microprocessor may operate in accordance with the computer program.

In addition, the present disclosure may be implemented such that the program or the digital signals are stored on the recording medium and transferred or the program or the digital signals are transferred via the network or the like to another independent computer system and executed thereby.

<21> The embodiment and modifications described above may be combined with one another.

Supplementary Notes

A supplementary description will be given below of a configuration of the present disclosure.

<A> An authentication method according to an aspect of the present disclosure is an authentication method for a group to which one or more devices, a first controller, and one or more second controllers belong, the one or more devices, the first controller, and the one or more second controllers being connected to a network, the authentication method including: selecting, using one of the first controller and the one or more second controllers, the first controller as a coordinator in accordance with an attribute of the first controller and the one or more second controllers, the coordinator being configured to manage a group key to be used in common in the group; generating, using the first controller, the group key; performing, using the first controller and each of the one or more devices, first mutual authentication between the first controller and the device; performing, using the first controller and each of the one or more second controllers, second mutual authentication between the first controller and the second controller; sharing, using the first controller, the group key with each device for which the first mutual authentication has been successful among the one or more devices; sharing, using the first controller, the group key with each second controller for which the second mutual authentication has been successful among the one or more second controllers; encrypting, using the first controller, transmission data by using the group key to generate encrypted data; generating, using the first controller, authentication data by using the group key from (i) a header, (ii) a source address corresponding to the first controller, (iii) a destination address corresponding to each device and each second controller, and (iv) the transmission data; and simultaneously broadcasting, using the first controller, a message including (i) the header, (ii) the source address, (iii) the destination address, (iv) the encrypted data, and (v) the authentication data from the first controller to each device for which the first mutual authentication has been successful and each second controller for which the second mutual authentication has been successful.

<B> An authentication method according to an aspect of the present disclosure is the authentication method according to the aspect A in which the transmission data may be a control command, and in which the authentication method may further include: receiving the message; decrypting the encrypted data by using the group key; verifying the authentication data; and executing the control command obtained through the decrypting if the verifying of the authentication data is successful, the receiving, the decrypting, the verifying, and the executing being performed using each device for which the first mutual authentication has been successful.

<C> An authentication method according to an aspect of the present disclosure is the authentication method according to the aspect A in which the encrypted data and the authentication data may be generated by using AES-CCM.

<D> An authentication method according to an aspect of the present disclosure is an authentication method for a group to which one or more devices and a first controller that are connected to a network belong, including: generating, using the first controller, a first group key; performing, using the first controller and each of the one or more devices, first mutual authentication between the first controller and the device; sharing, using the first controller, the first group key with each device for which the first mutual authentication has been successful among the one or more devices; selecting, in response to participation of a second controller in the group, using one of the first controller and the second controller, the first controller or the second controller as a coordinator in accordance with an attribute of the first controller and the second controller, the coordinator being configured to manage a group key to be used in common in the group; in response to selection of the second controller as the coordinator, performing, using the first controller and the second controller, second mutual authentication between the first controller and the second controller; generating, using the first controller, first authentication data by using the first group key from (i) a first header, (ii) a source address corresponding to the first controller, (iii) a destination address corresponding to each device and the second controller, and (iv) notification information indicating switching of the coordinator from the first controller to the second controller; simultaneously broadcasting, using the first controller, a switching notification including (i) the first header, (ii) the source address, (iii) the destination address, (iv) the notification information, and (v) the first authentication data from the first controller to each device for which the first mutual authentication has been successful and the second controller for which the second mutual authentication has been successful; generating, using the second controller, a second group key; performing, using the second controller and each device, third mutual authentication between the second controller and the device; updating, by using each device for which the third mutual authentication has been successful, the first group key stored as the group key to the second group key; performing, using the second controller and the first controller, fourth mutual authentication between the second controller and the first controller; and updating, using the first controller, the first group key stored as the group key to the second group key if the fourth mutual authentication for the first controller is successful.

<E> An authentication method according to an aspect of the present disclosure is the authentication method according to the aspect D that may further include: encrypting transmission data by using the first group key to generate encrypted data; generating second authentication data by using the first group key from (i) a second header, (ii) the source address, (iii) the destination address, and (iv) the transmission data; and simultaneously broadcasting a message including (i) the second header, (ii) the source address, (iii) the destination address, (iv) the encrypted data, and (v) the second authentication data to each device for which the first mutual authentication has been successful and the second controller for which the second mutual authentication has been successful, the encrypting, the generating, and the simultaneously broadcasting being performed using the first controller.

<F> An authentication method according to an aspect of the present disclosure is the authentication method according to the aspect D that may further include: encrypting transmission data by using the second group key to generate encrypted data; generating second authentication data by using the second group key from (i) a second header, (ii) a source address corresponding to the second controller, (iii) a destination address corresponding to each device and the first controller, and (iv) the transmission data; and simultaneously broadcasting a message including (i) the second header, (ii) the source address corresponding to the second controller, (iii) the destination address corresponding to each device and the first controller, (iv) the encrypted data, and (v) the second authentication data from the second controller to each device for which the third mutual authentication has been successful and the first controller for which the fourth mutual authentication has been successful, the encrypting, the generating, and the simultaneously broadcasting being performed using the second controller.

<G> A controller according to an aspect of the present disclosure is a controller connected to a network, the controller belonging to a group to which one or more devices and one or more other controllers that are connected to the network belong, the controller including: a memory; and a processor that executes instructions stored on the memory, wherein the processor selects a coordinator that manages a group key to be used in common in the group from among the controller and the one or more other controllers in accordance with an attribute of the controller and the one or more other controllers, and in response to selection of the controller as the coordinator, generates the group key, performs first mutual authentication with each of the one or more devices, shares the group key with each device for which the first mutual authentication has been successful among the one or more devices, performs second mutual authentication with each of the one or more other controllers, shares the group key with each controller for which the second mutual authentication has been successful among the one or more other controllers, encrypts transmission data by using the group key to generate encrypted data, generates authentication data by using the group key from (i) a header, (ii) a source address corresponding to the controller, (iii) a destination address corresponding to each device and each controller, and (iv) the transmission data, and simultaneously broadcasts a message including (i) the header, (ii) the source address, (iii) the destination address, (iv) the encrypted data, and (v) the authentication data to each device for which the first mutual authentication has been successful and each controller for which the second mutual authentication has been successful.

<H> A controller according to an aspect of the present disclosure is a controller connected to a network, the controller belonging to a group to which one or more devices and one or more other controllers that are connected to the network belong, one controller among the one or more other controllers having generated a first group key and having performed first mutual authentication with the one or more devices, the controller being connected to one device among the one or more devices for which the first mutual authentication has been successful, the controller including: a memory; a processor that executes instructions stored on the memory; and a communicator, wherein the processor performs second mutual authentication with the one controller, wherein if the second mutual authentication is successful, the communicator receives the first group key, the processor encrypts first transmission data by using the first group key to generate first encrypted data, and generates first authentication data by using the first group key from (i) a first header, (ii) a source address corresponding to the controller, (iii) a destination address corresponding to each device and each of other controllers, and (iv) the first transmission data, and the communicator simultaneously broadcasts a message including (i) the first header, (ii) the source address, (iii) the destination address, (iv) the first encrypted data, and (v) the first authentication data to each device and each of other controllers, wherein the processor selects the controller or the one controller as a coordinator in accordance with an attribute of the controller and the one controller, the coordinator being configured to manage a group key to be used in common in the group, wherein in response to selection of the controller as the coordinator, the processor generates a second group key, the communicator receives authentication information concerning the one or more devices from the one controller, the processor performs third mutual authentication with each of the one or more devices by using the authentication information, causes each device for which the third mutual authentication has been successful to update the first group key stored as the group key to the second group key, performs fourth mutual authentication with each of the one or more other controllers by using the authentication information, causes each of the other controllers for which the fourth mutual authentication has been successful to update the first group key stored as the group key to the second group key, encrypts second transmission data by using the second group key to generate second encrypted data, and generates second authentication data by using the second group key from (i) a second header, (ii) the source address, (iii) the destination address, and (iv) the second transmission data, and wherein the communicator simultaneously broadcasts a message including (i) the second header, (ii) the source address, (iii) the destination address, (iv) the second encrypted data, and (v) the second authentication data to each device and each of other controllers.

<I> A controller according to an aspect of the present disclosure is a controller connected to a network, the controller belonging to a group to which one or more devices that are connected to the network belong, the controller including: a memory; a processor that executes instructions stored on the memory; and a communicator, wherein the processor generates a first group key, performs first mutual authentication with each of the one or more devices, shares the first group key with each device for which the first mutual authentication has been successful among the one or more devices, selects, in response to participation of another controller in the group, a coordinator from among the controller and the other controller in accordance with an attribute of the controller and the other controller, the coordinator being configured to manage a group key to be used in common in the group, performs, in response to selection of the other controller as the coordinator, second mutual authentication with the other controller, shares the first group key with the other controller if the second mutual authentication for the other controller is successful, and generates authentication data by using the first group key from (i) a header, (ii) a source address corresponding to the controller, (iii) a destination address corresponding to each device and the other controller, and (iv) notification information indicating switching of the coordinator from the controller to the other controller, wherein the communicator simultaneously broadcasts a switching notification including (i) the header, (ii) the source address, (iii) the destination address, (iv) the notification information, and (v) the authentication data to each device for which the first mutual authentication has been successful and the other controller for which the second mutual authentication has been successful, and transmits authentication information to the other controller, wherein the processor performs third mutual authentication with the other controller, and wherein the communicator receives a second group key generated by the other controller if the third mutual authentication is successful and updates the first group key stored as the group key to the second group key.

<J> An authentication system according to an aspect of the present disclosure is a system including: one or more devices connected to a network; a first controller connected to the network; and one or more second controllers connected to the network, the one or more devices, the first controller, and the one or more second controllers belonging to a group, wherein one of the first controller and the one or more second controllers selects a coordinator from among the first controller and the one or more second controllers in accordance with an attribute of the first controller and the one or more second controllers, the coordinator being configured to manage a group key to be used in common in the group, wherein in response to selection of the first controller as the coordinator, the first controller generates the group key, the first controller and each of the one or more devices perform first mutual authentication between the first controller and the device, the first controller and each of the one or more second controllers perform second mutual authentication between the first controller and the second controller, the first controller shares the group key with each device for which the first mutual authentication has been successful among the one or more devices, the first controller shares the group key with each second controller for which the second mutual authentication has been successful among the one or more second controllers, wherein the first controller encrypts transmission data by using the group key to generate encrypted data, generates authentication data by using the group key from (i) a header, (ii) a source address corresponding to the first controller, (iii) a destination address corresponding to each device and each second controller, and (iv) the transmission data, and simultaneously broadcasts a message including (i) the header, (ii) the source address, (iii) the destination address, (iv) the encrypted data, and (v) the authentication data from the first controller to each device for which the first mutual authentication has been successful and each second controller for which the second mutual authentication has been successful.

The present disclosure allows a controller that distributes/updates a group key to be appropriately selected in a system in which a group formed on a network, such as HAN, includes a plurality of controllers, and thus is useful as an authentication system or the like in a system in which various devices and a plurality of controllers are connected to one another and operate while communicating with one another.

What is claimed is:

1. An authentication method for a group to which one or more devices, a first controller, and one or more second controllers belong, the one or more devices, the first controller, and the one or more second controllers being connected to a network, the authentication method comprising:
selecting, using one of the first controller and the one or more second controllers, the first controller as a coordinator, the coordinator being configured to manage a group key to be used in common in the group;
generating, using the first controller, the group key;
performing, using the first controller and each of the one or more devices, first mutual authentication between the first controller and the device;
performing, using the first controller and each of the one or more second controllers, second mutual authentication between the first controller and the second controller;
sharing, using the first controller, the group key with each device for which the first mutual authentication has been successful among the one or more devices;
sharing, using the first controller, the group key with each second controller for which the second mutual authentication has been successful among the one or more second controllers;
encrypting, using the first controller, transmission data by using the group key to generate encrypted data;
generating, using the first controller, authentication data by using the group key from (i) a header, (ii) a source address corresponding to the first controller, (iii) a destination address corresponding to each device and each second controller, and (iv) the transmission data; and
simultaneously broadcasting, using the first controller, a message including (i) the header, (ii) the source address, (iii) the destination address, (iv) the encrypted data, and (v) the authentication data from the first controller to each device for which the first mutual authentication has been successful and each second controller for which the second mutual authentication has been successful.

2. The authentication method according to claim 1, wherein, in selecting, the first controller is selected as the coordinator in accordance with a state of the first controller and the one or more second controllers.

3. The authentication method according to claim 1, wherein, in selecting, the first controller is selected as the coordinator in accordance with the number of paired devices of the first controller and the one or more second controllers.

4. The authentication method according to claim 1, wherein, in selecting, the first controller is selected as the coordinator in accordance with operating hours of the first controller and the one or more second controllers.

5. The authentication method according to claim 1, wherein, in selecting, the first controller is selected as the coordinator in accordance with a date of manufacture of the first controller and the one or more second controllers.

6. The authentication method according to claim 1, wherein, in selecting, the first controller is selected as the coordinator in accordance with user input.

7. The authentication method according to claim 1, wherein the transmission data is a control command, and wherein the authentication method further comprises:
receiving the message;
decrypting the encrypted data by using the group key;
verifying the authentication data; and
executing the control command obtained through the decrypting when the verifying of the authentication data is successful,
wherein the receiving, the decrypting, the verifying, and the executing being performed using each device for which the first mutual authentication has been successful.

8. The authentication method according to claim 1, wherein the encrypted data and the authentication data are generated by using AES-CCM (Counter with CBC (Cypher Block Chaining) MAC (Message Authentication Code)).

9. An authentication method for a group to which one or more devices and a first controller that are connected to a network belong, comprising:
generating, using the first controller, a first group key;
performing, using the first controller and each of the one or more devices, first mutual authentication between the first controller and the device;
sharing, using the first controller, the first group key with each device for which the first mutual authentication has been successful among the one or more devices;
selecting, in response to participation of a second controller in the group, using one of the first controller and the second controller, the first controller or the second controller as a coordinator, the coordinator being configured to manage a group key to be used in common in the group;

wherein in response to selection of the second controller as the coordinator,
  performing, using the first controller and the second controller, second mutual authentication between the first controller and the second controller;
  generating, using the first controller, first authentication data by using the first group key from (i) a first header, (ii) a source address corresponding to the first controller, (iii) a destination address corresponding to each device and the second controller, and (iv) notification information indicating switching of the coordinator from the first controller to the second controller; and
  simultaneously broadcasting, using the first controller, a switching notification including (i) the first header, (ii) the source address, (iii) the destination address, (iv) the notification information, and (v) the first authentication data from the first controller to each device for which the first mutual authentication has been successful and the second controller for which the second mutual authentication has been successful;
  generating, using the second controller, a second group key;
  performing, using the second controller and each device, third mutual authentication between the second controller and the device;
  updating, by using each device for which the third mutual authentication has been successful, the first group key stored as the group key to the second group key;
  performing, using the second controller and the first controller, fourth mutual authentication between the second controller and the first controller; and
  updating, using the first controller, the first group key stored as the group key to the second group key when the fourth mutual authentication for the first controller is successful.

10. The authentication method according to claim 9, further comprising:
  encrypting transmission data by using the first group key to generate encrypted data;
  generating second authentication data by using the first group key from (i) a second header, (ii) the source address, (iii) the destination address, and (iv) the transmission data; and
  simultaneously broadcasting a message including (i) the second header, (ii) the source address, (iii) the destination address, (iv) the encrypted data, and (v) the second authentication data to each device for which the first mutual authentication has been successful and the second controller for which the second mutual authentication has been successful,
  wherein the encrypting, the generating, and the simultaneously broadcasting being performed using the first controller.

11. The authentication method according to claim 9, further comprising:
  encrypting transmission data by using the second group key to generate encrypted data;
  generating second authentication data by using the second group key from (i) a second header, (ii) a source address corresponding to the second controller, (iii) a destination address corresponding to each device and the first controller, and (iv) the transmission data; and
  simultaneously broadcasting a message including (i) the second header, (ii) the source address corresponding to the second controller, (iii) the destination address corresponding to each device and the first controller, (iv) the encrypted data, and (v) the second authentication data from the second controller to each device for which the third mutual authentication has been successful and the first controller for which the fourth mutual authentication has been successful,
  wherein the encrypting, the generating, and the simultaneously broadcasting being performed using the second controller.

12. A controller connected to a network, the controller belonging to a group to which one or more devices and one or more other controllers that are connected to the network belong, the controller comprising:
  a memory; and
  a processor that executes instructions stored on the memory,
  wherein the processor
    selects a coordinator that manages a group key to be used in common in the group from among the controller and the one or more other controllers, and
    in response to selection of the controller as the coordinator,
      generates the group key,
      performs first mutual authentication with each of the one or more devices,
      shares the group key with each device for which the first mutual authentication has been successful among the one or more devices,
      performs second mutual authentication with each of the one or more other controllers,
      shares the group key with each controller for which the second mutual authentication has been successful among the one or more other controllers,
      encrypts transmission data by using the group key to generate encrypted data,
      generates authentication data by using the group key from (i) a header, (ii) a source address corresponding to the controller, (iii) a destination address corresponding to each device and each controller, and (iv) the transmission data, and
      simultaneously broadcasts a message including (i) the header, (ii) the source address, (iii) the destination address, (iv) the encrypted data, and (v) the authentication data to each device for which the first mutual authentication has been successful and each controller for which the second mutual authentication has been successful.

13. A controller connected to a network, the controller belonging to a group to which one or more devices and one or more other controllers that are connected to the network belong, one controller among the one or more other controllers having generated a first group key and having performed first mutual authentication with the one or more devices, the controller being connected to one device among the one or more devices for which the first mutual authentication has been successful, the controller comprising:
  a memory;
  a processor that executes instructions stored on the memory; and
  a communicator,
  wherein the processor performs second mutual authentication with the one controller, wherein when the second mutual authentication is successful,
the communicator receives the first group key,
the processor
encrypts first transmission data by using the first group key to generate first encrypted data, and
generates first authentication data by using the first group key from (i) a first header, (ii) a source address corresponding to the controller, (iii) a destination address corresponding to each device and each of other controllers, and (iv) the first transmission data, and
the communicator simultaneously broadcasts a message including (i) the first header, (ii) the source address, (iii) the destination address, (iv) the first encrypted data, and (v) the first authentication data to each device and each of other controllers,
wherein the processor selects the controller or the one controller as a coordinator, the coordinator being configured to manage a group key to be used in common in the group,
wherein in response to selection of the controller as the coordinator,
the processor generates a second group key,
the communicator receives authentication information concerning the one or more devices from the one controller,
the processor
performs third mutual authentication with each of the one or more devices by using the authentication information,
causes each device for which the third mutual authentication has been successful to update the first group key stored as the group key to the second group key,
performs fourth mutual authentication with each of the one or more other controllers by using the authentication information,
causes each of the other controllers for which the fourth mutual authentication has been successful to update the first group key stored as the group key to the second group key,
encrypts second transmission data by using the second group key to generate second encrypted data, and
generates second authentication data by using the second group key from (i) a second header, (ii) the source address, (iii) the destination address, and (iv) the second transmission data, and
wherein the communicator simultaneously broadcasts a message including (i) the second header, (ii) the source address, (iii) the destination address, (iv) the second encrypted data, and (v) the second authentication data to each device and each of other controllers.

14. A controller connected to a network, the controller belonging to a group to which one or more devices that are connected to the network belong, the controller comprising:
a memory;
a processor that executes instructions stored on the memory; and
a communicator,
wherein the processor
generates a first group key,
performs first mutual authentication with each of the one or more devices,
shares the first group key with each device for which the first mutual authentication has been successful among the one or more devices,
selects, in response to participation of another controller in the group, a coordinator from among the controller and the other controller, the coordinator being configured to manage a group key to be used in common in the group,
performs, in response to selection of the other controller as the coordinator, second mutual authentication with the other controller,
shares the first group key with the other controller if the second mutual authentication for the other controller is successful, and
generates authentication data by using the first group key from (i) a header, (ii) a source address corresponding to the controller, (iii) a destination address corresponding to each device and the other controller, and (iv) notification information indicating switching of the coordinator from the controller to the other controller,
wherein the communicator
simultaneously broadcasts a switching notification including (i) the header, (ii) the source address, (iii) the destination address, (iv) the notification information, and (v) the authentication data to each device for which the first mutual authentication has been successful and the other controller for which the second mutual authentication has been successful, and
transmits authentication information to the other controller,
wherein the processor performs third mutual authentication with the other controller, and
wherein the communicator receives a second group key generated by the other controller if the third mutual authentication is successful and updates the first group key stored as the group key to the second group key.

15. A system, comprising:
one or more devices connected to a network;
a first controller connected to the network; and
one or more second controllers connected to the network, the one or more devices, the first controller, wherein the first controller includes a memory and a processor that executes instructions stored on the memory; and the one or more second controllers belonging to a group,
wherein one of the first controller and the one or more second controllers selects a coordinator from among the first controller and the one or more second controllers, the coordinator being configured to manage a group key to be used in common in the group,
wherein in response to selection of the first controller as the coordinator,
the first controller generates the group key,
the first controller and each of the one or more devices perform first mutual authentication between the first controller and the device, the first controller and each of the one or more second controllers perform second mutual authentication between the first controller and the second controller,
the first controller shares the group key with each device for which the first mutual authentication has been successful among the one or more devices, and
the first controller shares the group key with each second controller for which the second mutual authentication has been successful among the one or more second controllers, wherein the first controller
    encrypts transmission data by using the group key to generate encrypted data,
    generates authentication data by using the group key from (i) a header, (ii) a source address corresponding to the first controller, (iii) a destination address corresponding to each device and each second controller, and (iv) the transmission data, and
    simultaneously broadcasts a message including (i) the header, (ii) the source address, (iii) the destination address, (iv) the encrypted data, and (v) the authentication data from the first controller to each device for which the first mutual authentication has been successful and each second controller for which the second mutual authentication has been successful.

* * * * *